US011706215B1

(12) United States Patent
Rao et al.

(10) Patent No.: US 11,706,215 B1
(45) Date of Patent: *Jul. 18, 2023

(54) SYSTEMS AND METHODS FOR CONTINUOUS AUTHENTICATION AND MONITORING

(71) Applicant: Wells Fargo Bank, N.A., San Francisco, CA (US)

(72) Inventors: Abhijit Rao, Irvine, CA (US); Masoud Vakili, Los Altos, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/654,736

(22) Filed: Mar. 14, 2022

Related U.S. Application Data

(63) Continuation of application No. 16/294,572, filed on Mar. 6, 2019, now Pat. No. 11,310,228.

(51) Int. Cl.
| | |
|---|---|
| *H04L 9/40* | (2022.01) |
| *H04N 5/14* | (2006.01) |
| *H04N 7/18* | (2006.01) |
| *G06V 20/40* | (2022.01) |
| *G06V 40/16* | (2022.01) |
| *H04L 67/146* | (2022.01) |

(52) U.S. Cl.
CPC .......... *H04L 63/0861* (2013.01); *G06V 20/46* (2022.01); *G06V 40/161* (2022.01); *G06V 40/172* (2022.01); *H04L 63/0884* (2013.01); *H04L 67/146* (2013.01); *H04N 5/145* (2013.01); *H04N 7/188* (2013.01)

(58) Field of Classification Search
CPC ............ H04L 63/0861; H04L 63/0884; H04L 67/146; G06V 20/46; G06V 40/161; G06V 40/172; H04N 5/145; H04N 7/188
See application file for complete search history.

(56) References Cited

U.S. PATENT DOCUMENTS

| | | |
|---|---|---|
| 8,856,541 B1 | 10/2014 | Chaudhury et al. |
| 9,301,140 B1 | 3/2016 | Costigan et al. |
| 10,104,394 B2 * | 10/2018 | Licata ................... H04N 19/521 |

(Continued)

FOREIGN PATENT DOCUMENTS

WO 2017/139325 A1 8/2017

*Primary Examiner* — Girumsew Wendmagegn
(74) *Attorney, Agent, or Firm* — Womble Bond Dickinson (US) LLP

(57) ABSTRACT

Systems, apparatuses, methods, and computer program products are disclosed for providing continuous session authentication and monitoring. An example method includes authenticating, at a first time, a session for a user of the client device based on an authentication image data structure and a plurality of first video frames captured before the first time. The example method further includes extracting sample data from a monitor region for each of a plurality of second video frames captured after the first time and generating motion data based on the extracted sample data. The example method further includes detecting, at a second time, a re-authentication trigger event based on the motion data. Subsequently, the example method includes re-authenticating the session based on the authentication image data structure and a plurality of third video frames captured after the second time.

20 Claims, 6 Drawing Sheets

(56) References Cited

U.S. PATENT DOCUMENTS

| | | |
|---|---|---|
| 10,594,987 B1 | 3/2020 | Nixon |
| 11,310,228 B1 * | 4/2022 | Rao .................... H04L 63/0861 |
| 2003/0215115 A1 | 11/2003 | Kim et al. |
| 2012/0044226 A1 | 2/2012 | Singh et al. |
| 2013/0239191 A1 | 9/2013 | Bostick |
| 2013/0239195 A1 | 9/2013 | Turgeman |
| 2014/0250523 A1 | 9/2014 | Savvides et al. |
| 2015/0110364 A1 | 4/2015 | Niinuma et al. |
| 2015/0242605 A1 | 8/2015 | Du et al. |
| 2015/0363585 A1 | 12/2015 | Gooding et al. |
| 2015/0373007 A1 | 12/2015 | Sheller et al. |
| 2016/0085948 A1 | 3/2016 | Liu et al. |
| 2016/0191567 A1 | 6/2016 | Chahal et al. |
| 2016/0277190 A1 | 9/2016 | Soldevila et al. |
| 2017/0046507 A1 | 2/2017 | Archer et al. |
| 2017/0308741 A1 | 10/2017 | Gleim et al. |
| 2017/0336926 A1 | 11/2017 | Chaudhri et al. |
| 2018/0068098 A1 | 3/2018 | Finzi et al. |
| 2018/0129795 A1 | 5/2018 | Katz-Oz et al. |
| 2018/0131692 A1 | 5/2018 | Katz-Oz et al. |
| 2019/0026544 A1 | 1/2019 | Hua et al. |
| 2019/0158730 A1 | 5/2019 | Ejiri et al. |

\* cited by examiner

SYSTEMS AND METHODS FOR CONTINUOUS AUTHENTICATION AND MONITORING

CROSS-REFERENCE TO RELATED APPLICATIONS

This non-provisional application is a continuation of U.S. patent application Ser. No. 16/294,572, filed Mar. 6, 2019, and titled "Systems And Methods For Continuous Authentication And Monitoring," the entirety of which is incorporated herein by reference.

TECHNOLOGICAL FIELD

Example embodiments of the present disclosure relate generally to session authentication and, more particularly, to systems and methods for continuous session authentication.

BACKGROUND

Traditional security systems authenticate a user only once and thereafter re-authenticate the user only if the session has been abandoned or otherwise discontinued. For example, a user may use a client device to log into a server, after which the server will create a session ID for the user and store the session ID in the memory of the client device (e.g., as a cookie). While the session is active, the client device electronically transmits the session ID to the server with each request. The server receives the session ID from the client device and compares the received session ID with the session ID stored in the memory of the server to authenticate the user's identity. If the session has been inactive for a certain amount of time (e.g., 30 minutes), the server may terminate the session and require the user to use the client device to log in to the server again, after which the server will create a new session ID for the user and store the new session ID in the memory of the client device. Applicant has identified many deficiencies and problems associated with these existing security systems. Through applied effort, ingenuity, and innovation, many of these identified deficiencies and problems have been solved by developing solutions that are in accordance with the embodiments of the present disclosure, many examples of which are described in detail herein.

BRIEF SUMMARY

Computing systems, computing apparatuses, computer-implemented methods, and computer program products are disclosed herein for providing continuous session authentication and monitoring. The continuous session authentication system provided herein solves the above problems by: initiating an authentication state in response to receiving a request to authenticate a session for a user of a client device; authenticating the session; switching to a monitoring state in response to authenticating the session; detecting a re-authentication trigger event based on motion data generated during the monitoring state; switching back to the authentication state in response to detecting the re-authentication trigger event; and re-authenticating the session.

In one example embodiment, a computing system is provided for continuous session authentication and monitoring. The computing system may comprise session authentication circuitry configured to authenticate, at a first time, a session for a user of a client device based on an authentication image data structure and a plurality of first video frames captured before the first time. The computing system may further comprise video monitoring circuitry in communication with the session authentication circuitry. The video monitoring circuitry may be configured to determine a plurality of monitor regions associated with a plurality of second video frames captured after the first time. The video monitoring circuitry may be further configured to assign a plurality of weighting values to each of the plurality of monitor regions. The video monitoring circuitry may be further configured to extract sample data from the plurality of monitor regions for each of a plurality of second video frames. The video monitoring circuitry may be further configured to generate motion data based on the extracted sample data, wherein the motion data comprises motion vector data indicative of motion vectors. The video monitoring circuitry may be further configured to apply the plurality of weighting values to the motion vector data to generate weight motion vectors. The video monitoring circuitry may be further configured to detect, at a second time, a re-authentication trigger event based on the motion data, including determining whether a magnitude of an average weighted motion vector exceeds a threshold motion vector value.

In another example embodiment, a computing system is provided for continuous session authentication and monitoring. The computing system may comprise session authentication circuitry in communication with a client device and a user profile server device. The session authentication circuitry may be configured to receive, from the client device at a first time, a session authentication request data structure indicative of a request to authenticate a session for a user of the client device. The session authentication circuitry may be further configured to retrieve, from the user profile server device, an authentication image data structure associated with the user. The authentication image data structure may have been captured before the first time. The session authentication circuitry may be further configured to authenticate, at a second time after the first time, the session based on the authentication image data structure and a first video data structure. The computing system may further comprise video monitoring circuitry in communication with the session authentication circuitry. The video monitoring circuitry may be configured to generate the first video data structure in response to receipt of the session authentication request data structure by the session authentication circuitry. The first video data structure may comprise a first video stream captured over a first duration of time that begins after about the first time, and the first video stream may comprise a plurality of first video frames. The video monitoring circuitry may be further configured to generate a second video data structure in response to authentication of the session by the session authentication circuitry. The second video data structure may comprise a second video stream captured over a second duration of time that begins after about the second time, and the second video stream may comprise a plurality of second video frames. The video monitoring circuitry may be further configured to determine a monitor region for each of the plurality of second video frames. The video monitoring circuitry may be further configured to extract sample data from the monitor region for each of the plurality of second video frames. The video monitoring circuitry may be further configured to generate motion data based on the sample data. The video monitoring circuitry may be further configured to detect, at a third time after the second time, a re-authentication trigger event based on the motion data. The video monitoring circuitry may be further configured to generate a third video data structure in response to detection of the re-authentication trigger event. The third video data structure may comprise a third video stream captured over a third duration of time that begins after about the third time, and the third video stream may comprise a plurality of third video frames. The session authentication circuitry may be further configured to re-authenticate, at a fourth time after the third time, the session based on the authentication image data structure and the third video data structure.

In another example embodiment, a computing apparatus is provided for continuous session authentication and monitoring. The computing apparatus may comprise session authentication circuitry configured to authenticate, at a first time, a session for a user of a client device based on an authentication image data structure and a plurality of first video frames captured before the first time. The computing apparatus may further comprise video monitoring circuitry in communication with the session authentication circuitry. The video monitoring circuitry may be configured to extract sample data from a monitor region for each of a plurality of second video frames captured after the first time. The video monitoring circuitry may be further configured to generate motion data based on the extracted sample data. The video monitoring circuitry may be further configured to detect, at a second time, a re-authentication trigger event based on the motion data. The session authentication circuitry may be further configured to re-authenticate the session based on the authentication image data structure and a plurality of third video frames captured after the second time.

In another example embodiment, a computing apparatus is provided for continuous session authentication and monitoring. The computing apparatus may comprise session authentication circuitry in communication with a client device and a user profile server device. The session authentication circuitry may be configured to receive, from the client device at a first time, a session authentication request data structure indicative of a request to authenticate a session for a user of the client device. The session authentication circuitry may be further configured to retrieve, from the user profile server device, an authentication image data structure associated with the user. The authentication image data structure may have been captured before the first time. The session authentication circuitry may be further configured to authenticate, at a second time after the first time, the session based on the authentication image data structure and a first video data structure. The computing apparatus may further comprise video monitoring circuitry in communication with the session authentication circuitry. The video monitoring circuitry may be configured to generate the first video data structure in response to receipt of the session authentication request data structure by the session authentication circuitry. The first video data structure may comprise a first video stream captured over a first duration of time that begins after about the first time, and the first video stream may comprise a plurality of first video frames. The video monitoring circuitry may be further configured to generate a second video data structure in response to authentication of the session by the session authentication circuitry. The second video data structure may comprise a second video stream captured over a second duration of time that begins after about the second time, and the second video stream may comprise a plurality of second video frames. The video monitoring circuitry may be further configured to determine a plurality of monitor regions for each of the plurality of second video frames. The video monitoring circuitry may be further configured to assign a plurality of weighting values to each of the plurality of monitor regions.

The video monitoring circuitry may be further configured to extract sample data from the plurality of monitor regions for each of the plurality of second video frames. The video monitoring circuitry may be further configured to generate motion data based on the sample data, wherein the motion data comprises vector data indicative of motion vectors. The video monitoring circuitry may be further configured to apply the plurality of weighting values to the motion vector data to generate weighted motion vectors. The video monitoring circuitry may be further configured to detect, at a third time after the second time, a re-authentication trigger event based on the motion data, including determining whether a magnitude of an average weighted motion vector exceeds a threshold motion vector value.

In another example embodiment, a computer-implemented method is provided for continuous session authentication and monitoring. The computer-implemented method may comprise authenticating, by session authentication circuitry at a first time, a session for a user of a client device based on an authentication image data structure and a plurality of first video frames captured before the first time. The computer-implemented method may further comprise determining, by video monitoring circuitry, a plurality of monitor regions associated with a plurality of second video frames captured after the first time. The computer-implemented method may further comprise assigning, by video monitoring circuitry, a plurality of weighting values to each of the plurality of monitor regions. The computer-implemented method may further comprise extracting, by video monitoring circuitry, sample data from the plurality of monitor regions for each of the plurality of second video frames. The computer-implemented method may further comprise generating, by the video monitoring circuitry, motion data based on the extracted sample data, wherein the motion data comprises motion vector data indicative of motion vectors. The computer-implemented method may further comprise applying the plurality of weighting values to the motion vector data to generate weighted motion vectors. The computer-implemented method may further comprise detecting, by the video monitoring circuitry at a second time, a re-authentication trigger event based on the motion data, including determining whether a magnitude of an average weighted motion vector exceeds a threshold motion vector value.

In another example embodiment, a computer-implemented method is provided for continuous session authentication and monitoring. The computer-implemented method may comprise receiving, by session authentication circuitry from a client device at a first time, a session authentication request data structure indicative of a request to authenticate a session for a user of the client device. The computer-implemented method may further comprise retrieving, by the session authentication circuitry from a user profile server device, an authentication image data structure associated with the user. The authentication image data structure may have been captured before the first time. The computer-implemented method may further comprise generating, by video monitoring circuitry, a first video data structure in response to receiving the session authentication request data structure by the session authentication circuitry. The first video data structure may comprise a first video stream captured over a first duration of time that begins after about the first time, and the first video stream may comprise a plurality of first video frames. The computer-implemented method may further comprise authenticating, by the session authentication circuitry at a second time after the first time, the session based on the authentication image data structure and the first video data structure. The computer-implemented method may further comprise generating, by the video monitoring circuitry, a second video data structure in response to authenticating the session by the session authentication circuitry. The second video data structure may comprise a second video stream captured over a second duration of time that begins after about the second time, and the second video stream may comprise a plurality of second video frames. The computer-implemented method may further comprise determining, by the video monitoring circuitry, a monitor region for each of the plurality of second video frames. The computer-implemented method may further comprise extracting, by the video monitoring circuitry, sample data from the monitor region for each of the plurality of second video frames. The computer-implemented method may further comprise generating, by the video monitoring circuitry, motion data based on the sample data. The computer-implemented method may further comprise detecting, by the video monitoring circuitry at a third time after the second time, a re-authentication trigger event based on the motion data. The computer-implemented method may further comprise generating, by the video monitoring circuitry, a third video data structure in response to detecting the re-authentication trigger event. The third video data structure may comprise a third video stream captured over a third duration of time that begins after about the third time, and the third video stream may comprise a plurality of third video frames. The computer-implemented method may further comprise re-authenticating, by the session authentication circuitry at a fourth time after the third time, the session based on the authentication image data structure and the third video data structure.

In another example embodiment, a computer program product is provided for continuous session authentication and monitoring. The computer program product may comprise at least one non-transitory computer-readable storage medium storing computer-executable program code instructions. The computer-executable program code instructions may, when executed by a computing apparatus, cause the computing apparatus to authenticate, by session authentication circuitry at a first time, a session for a user of a client device based on an authentication image data structure and a plurality of first video frames captured before the first time. The computer-executable program code instructions, when executed, may further cause the computing apparatus to determine, by video monitoring circuitry, a plurality of monitor regions associated with a plurality of second video frames captured after the first time. The computer-executable program code instructions, when executed, may further cause the computing apparatus to assign, by the video monitoring circuitry, a plurality of weighting values to each of the plurality of monitor regions. The computer-executable program code instructions, when executed, may further cause the computing apparatus to extract, by the video monitoring circuitry, sample data from the plurality of monitor regions for each of the plurality of second video frames. The computer-executable program code instructions, when executed, may further cause the computing apparatus to generate, by the video monitoring circuitry, motion data based on the extracted sample data, wherein the motion data comprises vector data indicative of motion vectors. The computer-executable program code instructions, when executed, may further cause the computing apparatus to apply, by the video monitoring circuitry, the plurality of weighting values to the motion vector data to generate weighted motion vectors. The computer-executable program code instructions, when executed, may further cause the computing apparatus to detect, by the video monitoring circuitry at a second time, a re-authentication trigger event based on the motion data, including determining whether a magnitude of an average weighted motion vector exceeds a threshold motion vector value.

In another example embodiment, a computer program product is provided for continuous session authentication and monitoring. The computer program product may comprise at least one non-transitory computer-readable storage medium storing computer-executable program code instructions. The computer-executable program code instructions may, when executed by a computing apparatus, cause the computing apparatus to receive, by session authentication circuitry from a client device at a first time, a session authentication request data structure indicative of a request to authenticate a session for a user of the client device. The computer-executable program code instructions, when executed, may further cause the computing apparatus to retrieve, by the session authentication circuitry from a user profile server device, an authentication image data structure associated with the user. The authentication image data structure may have been captured before the first time. The computer-executable program code instructions, when executed, may further cause the computing apparatus to generate, by video monitoring circuitry, a first video data structure in response to receipt of the session authentication request data structure by the session authentication circuitry. The first video data structure may comprise a first video stream captured over a first duration of time that begins after about the first time, and the first video stream may comprise a plurality of first video frames. The computer-executable program code instructions, when executed, may further cause the computing apparatus to authenticate, by the session authentication circuitry at a second time after the first time, the session based on the authentication image data structure and the first video data structure. The computer-executable program code instructions, when executed, may further cause the computing apparatus to generate, by the video monitoring circuitry, a second video data structure in response to authentication of the session by the session authentication circuitry. The second video data structure may comprise a second video stream captured over a second duration of time that begins after about the second time, and the second video stream may comprise a plurality of second video frames. The computer-executable program code instructions, when executed, may further cause the computing apparatus to determine, by the video monitoring circuitry, a monitor region for each of the plurality of second video frames. The computer-executable program code instructions, when executed, may further cause the computing apparatus to extract, by the video monitoring circuitry, sample data from the monitor region for each of the plurality of second video frames. The computer-executable program code instructions, when executed, may further cause the computing apparatus to generate, by the video monitoring circuitry, motion data based on the sample data. The computer-executable program code instructions, when executed, may further cause the computing apparatus to detect, by the video monitoring circuitry at a third time after the second time, a re-authentication trigger event based on the motion data. The computer-executable program code instructions, when executed, may further cause the computing apparatus t, generate, by the video monitoring circuitry, a third video data structure in response to detection of the re-authentication trigger event. The third video data structure may comprise a third video stream captured over a third duration of time that begins after about the third time, and the third video stream may comprise a plurality of third video frames. The computer-executable program code instructions, when executed, may further cause the computing apparatus to re-authenticate, by the session authentication circuitry at a fourth time after the third time, the session based on the authentication image data structure and the third video data structure.

The foregoing brief summary is provided merely for purposes of summarizing some example embodiments illustrating some aspects of the present disclosure. Accordingly, it will be appreciated that the above-described embodiments are merely examples and should not be construed to narrow the scope of the present disclosure in any way. It will be appreciated that the scope of the present disclosure encompasses many potential embodiments in addition to those summarized herein, some of which will be described in further detail below.

BRIEF DESCRIPTION OF THE DRAWINGS

The accompanying drawings, which are not necessarily drawn to scale, illustrate embodiments and features of the present disclosure. Together with the specification, including the brief summary above and the detailed description below, the accompanying drawings serve to explain the embodiments and features of the present disclosure. The components illustrated in the drawings represent components that may or may not be present in various embodiments or features of the disclosure described herein. Accordingly, some embodiments or features of the present disclosure may include fewer or more components than those shown in the drawings while not departing from the scope of the disclosure.

DETAILED DESCRIPTION

Figure 1:
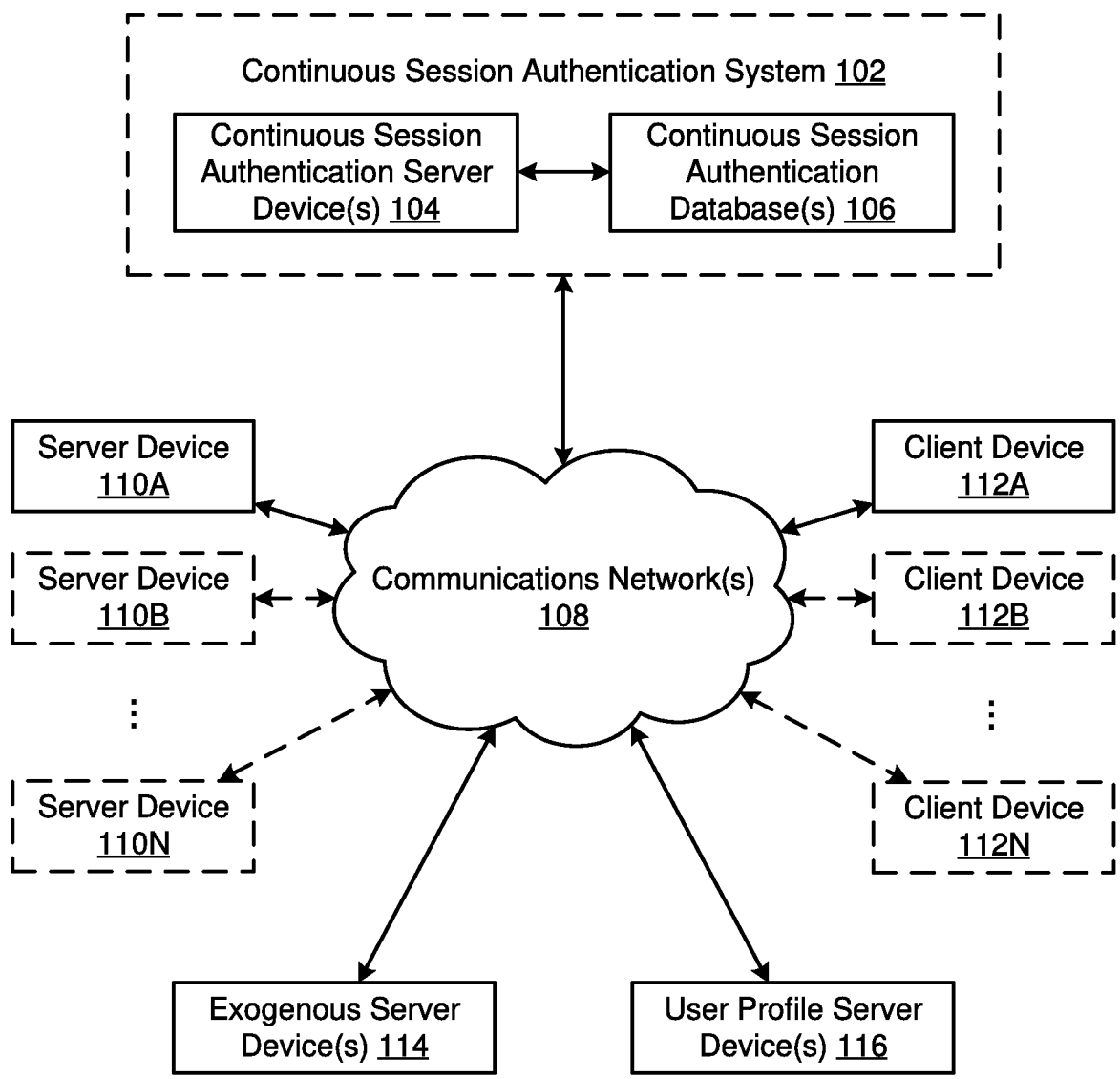
FIG. 1 illustrates a system diagram of a set of devices that may be involved in some example embodiments described herein.

Some embodiments of the present disclosure will now be described more fully hereinafter with reference to the accompanying drawings, in which some, but not all embodiments of the disclosures are shown. Indeed, these disclosures may be embodied in many different forms and should not be construed as limited to the embodiments set forth herein; rather, these embodiments are provided so that this disclosure will satisfy applicable legal requirements. Like numbers refer to like elements throughout.

Overview

As noted above, methods, apparatuses, systems, and computer program products are described herein that provide continuous session authentication and monitoring by, in some instances: initiating an authentication state in response to receiving a request to authenticate a session for a user of a client device; authenticating the session; switching to a monitoring state in response to authenticating the session; detecting a re-authentication trigger event based on motion data generated during the monitoring state; switching back to the authentication state in response to detecting the re-authentication trigger event; and re-authenticating the session.

Traditionally, active continuous authentication systems require constant user interaction and are thus highly intrusive to the user's use of the user's device. Existing passive continuous authentication systems require minimal user interaction but are resource and data intensive and thus are costly and slow. Accordingly, Applicant has identified a need for a continuous session authentication system facilitating a faster, cheaper, and less computing resource and data intensive process for providing continuous session authentication and monitoring.

In some embodiments, the present disclosure relates to a continuous session authentication system for providing continuous session authentication and monitoring. In some embodiments, the continuous session authentication system first identifies one or more monitor regions (e.g., regions of interest, such as regions of interest in the face of a user attempting to log-in and open a secure online session, such as one or more regions encompassing the eyes of the user). In some embodiments, the continuous session authentication system then performs authentication (e.g., more computationally intensive) utilizing a region-by-region comparison to a stored authentication image data structure (e.g., an image of the user's face or biometric facial data (e.g., landmark data, nodal point data) indicative thereof), an image or video from a previously authenticated session, or both. In some embodiments, once authenticated, the continuous session authentication system switches to a monitoring state (e.g., less computationally intensive) such that instead of a requiring a computationally intensive process of continuous region-by-region analysis of the face, the monitoring state comprises parsing the video frame data, extracting motion data from one or more particular regions, comparing the extracted motion data to a threshold, and only upon exceeding the threshold, calling the authentication state for re-authentication.

In one illustrative example, once the continuous session authentication system performs an initial authentication, rather than continually performing the resource intensive process of conducting the region-by-region analysis used for authentication, the continuous session authentication system may monitor one or more particular monitor regions for movement (e.g., less resource intensive) and look for abrupt changes, gradual changes, or both in the field of view of the client device's camera through generating and analyzing motion vectors, residuals, or both. To do so, the continuous session authentication system may parse the video frame data and extract sample data for the one or more identified monitor regions (e.g., sample data for one or more blocks, macroblocks, slices, coding tree units, coding tree blocks, or any other suitable regions of the video frames). The sample data may comprise, for example, pixel data, luma data, chroma data, color data (e.g., RGB, XYZ), any other suitable data, or any combination thereof. In some embodiments, the continuous session authentication system may implement the parsing as a part of an software development kit (SDK) where the continuous session authentication system selects sample data from individual video frame to identify one or more monitor regions.

Continuing this illustrative example, for the one or more monitor regions, the continuous session authentication system then may perform motion estimation analysis (e.g., inter prediction) to extract motion vectors from the video frames. In some embodiments, the continuous session authentication system may implement the extracting using an SDK starting with the user's face as a whole to track the user's face and ensure that the authenticated user is present throughout the session. The continuous session authentication system then may apply a smoothing filter to the motion vectors to reduce or eliminate noisy regions from the motion estimation analysis and to improve tracking of the user's face and the one or more monitor regions. The continuous session authentication system then may determine an average or median motion vector in the one or more monitor regions.

Continuing this illustrative example, in some instances, the continuous session authentication system may identify a high level of activity in a monitor region by determining that the motion or energy in the monitor region (e.g., as indicated by the magnitude of an average or median motion vector) exceeds a threshold value. For example, the continuous session authentication system then may compare the average or median motion vector to a threshold value (e.g., a value that, when exceeded, indicates that there is too much motion in the sequence of video frames) and determine whether to perform re-authentication. The continuous session authentication system may set the threshold value by experimentally measuring the average or median motion vectors in different movement conditions (e.g., walking, sitting on a train, standing at home, and other such scenarios). For example, the continuous session authentication system may determine that the user is walking and set the threshold motion vector value equal to experimental average motion vector for a "walking" experimental movement condition (e.g., an experimentally measured average or median motion vector in a walking experimental movement condition).

Continuing this illustrative example, the continuous session authentication system then may determine whether to authenticate the monitor region based on amount of motion present in the monitor region to determine if the monitor region, or the entire face, is trackable. The continuous session authentication system then may use the new position of the monitor region to track the monitor region. Initially, the continuous session authentication system may implement this tracking as face tracking and then narrow the tracking down to tracking specific regions of the face to reduce computational intensity. In the event that the continuous session authentication system detects a large motion or determines that the monitor region has left the screen (e.g., picture, frame), the continuous session authentication system then may call for re-authentication. In some instances, depending on the level of motion, the continuous session authentication system may require differing scores or take differing actions (e.g., re-authentication or automatic log-out).

In some embodiments, in the monitoring state, and in addition as an alternative to utilizing the one or more monitor regions and motion estimation analysis, the continuous session authentication system described herein may provide for improved continuous user monitoring and authentication by utilizing sensors available on the user's device (e.g., smartphone), such as the touchscreen, accelerometer, gyroscope, and proximity sensor. The continuous session authentication system described herein may continually or intermittently monitor the user's biometric attributes and behavior to ensure continuous session security which is seamless, reliable, and not intrusive to the user's use of the user's device. For example, the security system may constantly sense the user's interactions with the user's device and authenticate the user in run-time through monitoring for biometric data along with selective behavioral data.

In some embodiments, the continuous session authentication system described herein may provide for generating behavioral attribute data structures. In some embodiments, the continuous session authentication system described herein may provide for synchronizing temporal information with biometric data extracted from a video stream on a timeline to generate aggregated behavioral data. For example, the continuous session authentication system described herein may provide for extracting biometric attributes from a video stream, storing various sensor data using the video stream as a reference, deriving biometric facial data from the video stream, and correlating the sensor data with the biometric facial data to generate behavioral data.

In some embodiments, the principal source for biometric data is video data, such as selfie video data. The continuous session authentication system may use this video data as a reference to store various sensor data, such as tilt data, acceleration data, and touch sensor data. The continuous session authentication system may generate a pointer (e.g., an "ID") to a block of data that stores the sensor data in a form that is native to the sensor from which it is obtained (e.g., native sensor data). In some embodiments, the continuous session authentication system may derive secondary data (e.g., biometric attribute data, behavioral attribute data) from the primary data (e.g., video data, sensor data). For example, the continuous session authentication system may use video data to derive biometric facial data such as landmark or nodal point data in the video stream. In another example, the continuous session authentication system may use sensor data to derive behavioral attributes of the user. For instance, the continuous session authentication system may overlay region information (e.g., biometric facial data) with the sensor data to generate behavioral attribute data. In yet another example, the continuous session authentication system may store sensor data in relation to video frames, extract biometric information from the video frames, and overlay this information with exogenous data from external sources to derive aggregated behavioral attributes of the user. For instance, the continuous session authentication system may retrieve, based on the sensor data, global positioning system (GPS) data to identify the location of the user and then use this location data to generate aggregated behavioral attributes, such as "Customer John Doe checks his account summary every morning from a particular coffee shop."

There are many advantages of these and other embodiments described herein, such as: facilitating a faster, cheaper, and less computing resource and data intensive process for providing continuous session authentication and monitoring; and facilitating a faster, cheaper, and less computing resource and data intensive process for generating user behavioral data and aggregated behavioral data. Among other features, these and other embodiments described herein at least: reflect improvements in the functioning of computing systems or devices, such as a continuous session authentication system, server device, or client device; reflect improvements to other technologies or technical fields as described herein; and effect transformations or reductions of particular articles to different states or things, such as video data structures, sample data, motion data, authentication and monitoring states, and other articles described herein.

Definitions

As used herein, the terms "data," "data structure," "content," "information," and similar terms may be used interchangeably to refer to data capable of being transmitted, received, and/or stored in accordance with embodiments of the present disclosure. Thus, use of any such terms should not be taken to limit the spirit or scope of embodiments of the present disclosure. Further, where a first computing device or circuitry is described herein to receive data from a second computing device or circuitry, it will be appreciated that the data may be received directly from the second computing device or circuitry or may be received indirectly via one or more intermediary computing devices or circuitries, such as, for example, one or more servers, relays, routers, network access points, base stations, hosts, and/or the like, sometimes referred to herein as a "network." Similarly, where a first computing device or circuitry is described herein as sending data to a second computing device or circuitry, it will be appreciated that the data may be sent directly to the second computing device or circuitry or may be sent indirectly via one or more intermediary computing devices or circuitries, such as, for example, one or more servers, remote servers, cloud-based servers (e.g., cloud utilities), relays, routers, network access points, base stations, hosts, and/or the like.

The term "comprising" means including but not limited to, and should be interpreted in the manner it is typically used in the patent context. Use of broader terms such as comprises, includes, and having should be understood to provide support for narrower terms such as consisting of, consisting essentially of, and comprised substantially of.

The phrases "in some embodiments," "in other embodiments," "in some instances," and the like generally mean that the particular feature, structure, or characteristic following the phrase may be included in at least one embodiment of the present disclosure, and may be included in more than one embodiment of the present disclosure (importantly, such phrases do not necessarily refer to the same embodiment).

The word "example" is used herein to mean "serving as an example, instance, or illustration." Any implementation described herein as "example" is not necessarily to be construed as preferred or advantageous over other implementations.

If the specification states a component or feature "may," "can," "could," "should," "typically," "optionally," "generally," "additionally," "alternatively," "for example," "often," or "might" (or other such language) be included or have a characteristic, that particular component or feature is not required to be included or to have the characteristic. Such component or feature may be optionally included in some embodiments, or it may be excluded.

The terms "processor" and "processing circuitry" are used herein to refer to any programmable microprocessor, microcomputer or multiple processor chip or chips that can be configured by software instructions (applications) to perform a variety of functions, including the functions of the various embodiments described above. In some devices, multiple processors may be provided, such as one processor dedicated to wireless communication functions and one processor dedicated to running other applications. Software applications may be stored in the internal memory before they are accessed and loaded into the processors. The processors may include internal memory sufficient to store the application software instructions. In many devices the internal memory may be a volatile or nonvolatile memory, such as flash memory, or a mixture of both. The memory may also be located internal to another computing resource (e.g., enabling computer readable instructions to be downloaded over the Internet or another wired or wireless connection).

For the purposes of this description, a general reference to "memory" refers to memory accessible by the processors including internal memory or removable memory plugged into the device, remote memory (e.g., cloud storage), and/or memory within the processors themselves. For instance, memory may be any non-transitory computer readable medium having computer readable instructions (e.g., computer program instructions) stored thereof that are executable by a processor.

The term "computing device" is used herein to refer to any one or all of programmable logic controllers (PLCs), programmable automation controllers (PACs), industrial computers, desktop computers, personal data assistants (PDAs), laptop computers, tablet computers, smart books, palm-top computers, personal computers, kiosk computers, smartphones, smartwatches, headsets, smart speakers, and similar electronic devices equipped with at least a processor configured to perform the various operations described herein. Computing devices such as smartphones, laptop computers, tablet computers, headsets, and smartwatches are generally referred to herein as mobile devices.

The terms "server" and "server device" are used to refer to any computing device capable of functioning as a server, such as a master exchange server, web server, mail server, document server, or any other type of server. A server may be a dedicated computing device or a computing device including a server module (e.g., an application which may cause the computing device to operate as a server). A server module (e.g., server application) may be a full function server module, or a light or secondary server module (e.g., light or secondary server application) that is configured to provide synchronization services among the dynamic databases on computing devices. A light server or secondary server may be a slimmed-down version of server type functionality that can be implemented on a computing device, such as a smart phone, thereby enabling it to function as an Internet server (e.g., an enterprise e-mail server) only to the extent necessary to provide the functionality described herein.

The terms "circuitry," "module," "utility," and similar terms should be understood broadly to include hardware. In some embodiments, these terms may also include software for configuring the hardware. For example, in some embodiments, "circuitry" may include processing circuitry, memory, communications circuitry, and/or input-output circuitry. In some embodiments, other elements of the present disclosure may provide or supplement the functionality of particular circuitry, modules, or utilities.

The term "set" refers to a collection of zero or more elements. For example, a set may refer to a data structure having zero or more data elements.

The term "sample" refers to an electronic value or data structure associated with one or more pixels. For example, a sample may comprise a luma sample, a chroma sample, a color plane sample (e.g., red, green, blue), a monochrome sample, a tri-stimulus color sample, any other suitable sample, electronic values or data structures associated therewith (including, but not limited to, links or pointers), or any combination thereof.

The term "luma" and the symbols "Y" and "L" refer to a sample array or single sample that is representing the monochrome signal related to the primary colors.

The term "chroma" and the symbols "Cb" and "Cr" refer to a sample array or single sample that is representing one of the two color difference signals related to the primary colors.

The term "block" refers to an M×N (M-column by N-row) array of samples, or an M×N array of transform coefficients.

The term "transform coefficient" refers to a scalar quantity, considered to be in a frequency domain, that is associated with a particular one-dimensional or two-dimensional frequency index in an inverse transform part of the decoding process. In some embodiments, the term "transform coefficient" refers to a scalar quantity, considered to be in a frequency domain, that is associated with a particular one-dimensional or two-dimensional frequency index in a transform in the decoding process.

The term "residual" refers to the difference between a prediction of a sample or data element and its value.

The term "macroblock" refers to a 16×16 block of luma samples and two corresponding blocks of chroma samples of a picture that has three sample arrays, or a 16×16 block of samples of a monochrome picture or a picture that is coded using three separate color planes.

The term "slice" refers to an integer number of macroblocks or macroblock pairs ordered consecutively in a raster scan within a particular slice group, and the term "slice group" refers to a subset of the macroblocks or macroblock pairs of a picture. In some embodiments, the term "slice" refers to an integer number of CTUs contained in one independent slice segment and all subsequent dependent slice segments, if any, that precede the next independent slice segment, if any, within the same access unit. The term "slice segment" refers to an integer number of CTUs ordered consecutively in the tile scan and contained in a single network abstraction layer (NAL) unit.

The term "picture" refers to a collective term for a field or a frame.

The term "frame" refers to an array of luma samples in monochrome format or an array of luma samples and two corresponding arrays of chroma samples in 4:2:0, 4:2:2, and 4:4:4 color format. A frame is composed of two fields, a top field and a bottom field. In some embodiments, the term "frame" refers to the composition of a top field and a bottom field, where even numbered sample rows (e.g., 0, 2, 4, and so on) originate from the top field and odd numbered sample rows (e.g., 1, 3, 5, and so on) originate from the bottom field.

The term "field" refers to an assembly of alternate rows of a frame.

The term "coding tree unit (CTU)" refers to a coding tree block (CTB) of luma samples, two corresponding CTBs of chroma samples of a picture that has three sample arrays, or a CTB of samples of a monochrome picture or a picture that is coded using three separate color planes (e.g., red, green, and blue (RGB)) and syntax structures used to code the samples.

The term "coding tree block (CTB)" refers to an N×N block of samples for some value of N such that the division of an array or single sample from one of the three arrays (luma and two chroma) that compose a picture in 4:2:0, 4:2:2, or 4:4:4 color format, or the array or a single sample of the array that compose a picture in monochrome format, into CTBs is a partitioning.

The term "partitioning" refers to the division of a set into subsets such that each element of the set is in exactly one of the subsets.

The term "coding block" refers to an N×N block of samples for some value of N such that the division of a CTB into coding blocks is a partitioning.

The term "coding unit" refers to a coding block of luma samples, two corresponding coding blocks of chroma samples of a picture that has three sample arrays, or a coding block of samples of a monochrome picture or a picture that is coded using three separate color planes and syntax structures used to code the samples.

The term "motion vector" refers to a two-dimensional vector used for inter prediction that provides an offset from the coordinates in a picture to the coordinates in a reference picture.

The term "inter prediction" refers to a prediction derived in a manner that is dependent on data elements (e.g., sample values or motion vectors) of one or more reference pictures. In some embodiments, the term "inter prediction" refers to a prediction derived from samples of reference pictures other than the current picture.

Having set forth a series of definitions called-upon throughout this application, an example system architecture is described below for implementing example embodiments and features of the present disclosure.

System Architecture

Methods, systems, apparatuses, and computer program products of the present disclosure may be embodied by any of a variety of devices. For example, the method, system, apparatus, and computer program product of an example embodiment may be embodied by a networked device, such as one or more servers, remote servers, cloud-based servers (e.g., cloud utilities), or other network entities, configured to communicate with one or more devices, such as one or more server devices, client devices, remote devices, or a combination thereof. Example embodiments of the client devices include any of a variety of stationary or mobile computing devices, such as a mobile telephone, smartphone, smartwatch, smart speaker, portable digital assistant (PDA), tablet computer, laptop computer, desktop computer, kiosk computer, automated teller machine (ATM), electronic workstation, robot (e.g., a security robot), surveillance device, access control device, any other suitable computing device, or any combination of the aforementioned devices.

FIG. 1 illustrates a system diagram of a set of devices that may be involved in some example embodiments described herein. In this regard, FIG. 1 discloses an example environment 100 within which embodiments of the present disclosure may operate to provide continuous session authentication and monitoring. As illustrated, a continuous session authentication system 102 may be connected to one or more continuous session authentication server devices 104 in communication with one or more continuous session authentication databases 106. The continuous session authentication system 102 may be connected to one or more server devices 110A-110N, one or more client devices 112A-112N, one or more exogenous server devices 114, and one or more user profile server devices 116 through one or more communications networks 108. One or more communications networks 108 may include any suitable network or combination of networks, such as a virtual network, the Internet, a local area network (LAN), a Wi-Fi network, a Worldwide Interoperability for Microwave Access (WiMAX) network, a home network, a cellular network, a near field communications (NFC) network, other types of networks, or a combination thereof. In some embodiments, the continuous session authentication system 102 may be configured to continuously authenticate and monitor a session between a server device 110 and a client device 112 as described in further detail below.

The continuous session authentication system 102 may be embodied as one or more specialized circuitries, computers, or computing systems and may comprise one or more continuous session authentication server devices 104 and one or more continuous session authentication databases 106. The one or more continuous session authentication server devices 104 may be embodied as one or more servers, remote servers, cloud-based servers (e.g., cloud utilities), processors, any other suitable server devices, or any combination thereof. The one or more continuous session authentication server devices 104 are configured to receive, process, generate, and transmit data, signals, and electronic information to facilitate the operations of the continuous session authentication system 102. The one or more continuous session authentication databases 106 may be embodied as one or more data storage devices, such as Network Attached Storage (NAS) devices or separate databases or servers. The one or more continuous session authentication databases 106 are configured to store and provide access to data and information used by the continuous session authentication system 102 to facilitate the operations of the continuous session authentication system 102. For example, the one or more continuous session authentication databases 106 may store user account credentials for users of one or more server devices 110A-110N, one or more client devices 112A-112N, one or more exogenous server devices 114, one or more user profile server devices 116, or a combination thereof. In another example, the one or more continuous session authentication databases 106 may store data regarding device characteristics for the one or more server devices 110A-110N, one or more client devices 112A-112N, one or more exogenous server devices 114, one or more user profile server devices 116, or a combination thereof.

The one or more server devices 110A-110N may be embodied by one or more computing devices. In some embodiments, the one or more server devices 110A-110N may be embodied as one or more servers, remote servers, cloud-based servers (e.g., cloud utilities), processors, or any other suitable devices, or any combination thereof. For example, the one or more server devices 110A-110N may be session authentication servers. In some embodiments, the one or more server devices 110A-110N may receive, process, generate, and transmit data, signals, and electronic information to facilitate the operations of the continuous session authentication system 102. Information received by the continuous session authentication system 102 from one or more server devices 110A-110N may be provided in various forms and via various methods.

The one or more client devices 112A-112N may be embodied by one or more computing devices. Information received by the continuous session authentication system 102 from the one or more client devices 112A-112N may be provided in various forms and via various methods. For example, the one or more client devices 112A-112N may be smartphones, laptop computers, netbooks, tablet computers, wearable devices, desktop computers, electronic workstations, or the like, and the information may be provided through various modes of data transmission provided by these client devices. In some embodiments, the one or more client devices 112A-112N may include or store various data and electronic information associated with one or more users. For example, the one or more client devices 112A-112N may include or store user information (including, but not limited to, user profile information, authentication image data structures, and biometric facial data), session authentication request data structures, video data structures, video streams, video frames, sample data, motion data, motion vectors, residuals, session data (e.g., data associated with a session), sensor data structures, sensor data, any other suitable data, or any combination thereof. In some embodiments, the one or more client devices 112A-112N may be associated with one or more users.

In embodiments where a client device 112 is a mobile device, such as a smartphone or tablet, the mobile device may execute an "app" (e.g., a thin-client application) to interact with the continuous session authentication system 102, one or more server devices 110A-110N, one or more exogenous server devices 114, one or more user profile server devices 116, or a combination thereof. Such apps are typically designed to execute on mobile devices, such as tablets or smartphones. For example, an app may be provided that executes on mobile device operating systems such as Apple Inc.'s iOS, Google LLC's Android®, or Microsoft Corporation's Windows®. These platforms typically provide frameworks that allow apps to communicate with one another and with particular hardware and software components of mobile devices. For example, the mobile operating systems named above each provide frameworks for interacting with camera circuitry, microphone circuitry, sensor circuitry, location services circuitry, wired and wireless network interfaces, user contacts, and other applications in a manner that allows for improved interactions between apps while also preserving the privacy and security of individual users. In some embodiments, a mobile operating system may also provide for improved communication interfaces for interacting with external devices (e.g., server devices, client devices, exogenous server devices, user profile server devices). Communication with hardware and software modules executing outside of the app is typically provided via APIs provided by the mobile device operating system.

The one or more exogenous server devices 114 may be embodied by one or more computing devices, server devices, servers, data storage devices, databases, or a combination thereof. In some embodiments, the one or more exogenous server devices 114 may be embodied as one or more data storage devices, such as one or more NAS devices, or as one or more separate databases or database servers. In some embodiments, the one or more exogenous server devices 114 may be embodied as one or more servers, remote servers, cloud-based servers (e.g., cloud utilities), processors, or any other suitable devices, or any combination thereof. In some embodiments, the one or more exogenous server devices 114 may receive, process, generate, and transmit data, signals, and electronic information to facilitate the operations of the continuous session authentication system 102. Information received by the continuous session authentication system 102 from one or more exogenous server devices 114 may be provided in various forms and via various methods. It will be understood, however, that in some embodiments, the one or more exogenous server devices 114 need not themselves be databases or database servers, but may be peripheral devices communicatively coupled to databases or database servers.

In some embodiments, the one or more exogenous server devices 114 may include or store various data and electronic information associated with one or more users, one or more exogenous events, or a combination thereof. For example, the one or more exogenous server devices 114 may include or store exogenous data structures comprising exogenous information associated with one or more users of the one or more client devices 112A-112N. In one illustrative example, an exogenous server device 114 may receive, from the continuous session authentication system 102 over the one or more communications networks 108, a request for exogenous information associated with the user of the client device 112A; generate an exogenous data structure comprising the exogenous information; and transmit, to the continuous session authentication system 102 over the one or more communications networks 108, the exogenous data structure comprising the exogenous information.

The one or more user profile server devices 116 may be embodied by one or more computing devices, server devices, servers, data storage devices, databases, or a combination thereof. In some embodiments, the one or more user profile server devices 116 may be embodied as one or more data storage devices, such as one or more NAS devices, or as one or more separate databases or database servers. In some embodiments, the one or more user profile server devices 116 may be embodied as one or more servers, remote servers, cloud-based servers (e.g., cloud utilities), processors, or any other suitable devices, or any combination thereof. In some embodiments, the one or more user profile server devices 116 may receive, process, generate, and transmit data, signals, and electronic information to facilitate the operations of the continuous session authentication system 102. Information received by the continuous session authentication system 102 from one or more user profile server devices 116 may be provided in various forms and via various methods. It will be understood, however, that in some embodiments, the one or more user profile server devices 116 need not themselves be databases or database servers, but may be peripheral devices communicatively coupled to databases or database servers.

In some embodiments, the one or more user profile server devices 116 may include or store various data and electronic information associated with one or more users. In some embodiments, the one or more user profile server devices 116 may include or store user profile data structures comprising user profile information associated with one or more users of the one or more client devices 112A-112N. In one illustrative example, a user profile server device 116 may receive, from the continuous session authentication system 102 over the one or more communications networks 108, a request for user profile information associated with a user of the client device 112A; generate a user profile data structure comprising the user profile information; and transmit, to the continuous session authentication system 102 over the one or more communications networks 108, the user profile data structure comprising the user profile information. In some embodiments, the user profile data structures may further comprise, or be stored in association with (e.g., via links or pointers), authentication image data structures, authentication video data structures, biometric facial data, and combinations thereof. In another illustrative example, a user profile server device 116 may receive, from the continuous session authentication system 102 over the one or more communications networks 108, a request for an authentication image associated with a user of the client device 112A; generate an authentication image data structure comprising an authentication image of the user's face, an image or video of the user's face from a previously authenticated session, biometric facial data (e.g., landmark data, nodal point data) indicative thereof, or a combination thereof; and transmit, to the continuous session authentication system 102 over the one or more communications networks 108, the authentication image data structure.

Additionally or alternatively, the one or more server devices 110A-110N, the one or more client devices 112A-112N, the one or more exogenous server devices 114, the one or more user profile server devices 116, or any combination thereof may interact with the continuous session authentication system 102 over one or more communications networks 108. As yet another example, the one or more server devices 110A-110N, the one or more client devices 112A-112N, the one or more exogenous server devices 114, the one or more user profile server devices 116, or a combination thereof may include various hardware or firmware designed to interface with the continuous session authentication system 102. For example, an example server device 110A may be a session authentication server modified to communicate with the continuous session authentication system 102, and another example server device 110B may be a purpose-built session authentication server offered for the primary purpose of communicating with the continuous session authentication system 102. As another example, an example client device 112A may be a user's smartphone and may have an application stored thereon facilitating communication with the continuous session authentication system 102, whereas another example client device 112B may be a purpose-built device (e.g., an ATM, an access control device, a security robot) offered for the primary purpose of communicating with the continuous session authentication system 102.

As a foundation for some embodiments, the continuous session authentication system 102 may provide for continuously authenticating and monitoring a session between a client device 112 and a server device 110. In some embodiments, the continuous session authentication system 102 may provide for receiving, from the client device 112 at a first time, a session authentication request data structure indicative of a request to authenticate a session for a user of the client device 112.

In some embodiments, the continuous session authentication system 102 may provide for retrieving, from a user profile server device 116, an authentication image data structure associated with the user in response to receiving the session authentication request data structure. The authentication image data structure may have been captured before the first time. The authentication image data structure may comprise a stored authentication image of the user's face, an image or video of the user's face from a previously authenticated session, biometric facial data (e.g., landmark data, nodal point data) indicative thereof, or a combination thereof.

In some embodiments, the continuous session authentication system 102 may provide for generating a first video data structure in response to receiving the session authentication request data structure. The first video data structure may comprise a first video stream captured by camera circuitry of the client device 112 over a first duration of time that begins after about the first time, and the first video stream may comprise a plurality of first video frames. In some embodiments, the first video stream may comprise a face of the user, and the continuous session authentication system 102 may provide for generating the first video data structure based on a continuous monitoring of the face of the user.

In some embodiments, the continuous session authentication system 102 may provide for authenticating, at a second time after the first time, the session based on the authentication image data structure and the first video data structure. In some embodiments, the continuous session authentication system 102 may provide for authenticating the session for the user based on a region-by-region comparison of the authentication image data structure and one of the plurality of first video frames.

In some embodiments, the continuous session authentication system 102 may provide for determining one or more monitor regions for the plurality of second video frames. For example, the continuous session authentication system 102 may process the first data structure, the second data structure, or both to determine (e.g., identify) one or more monitor regions for use in monitoring the plurality of second video frames. The one or more monitor regions may be one or more regions of interest, such as regions of interest in the face of a user attempting to log-in and open a secure online session. For example, a monitor region may comprise a region of a face of the user, such as the region of the face of the user comprising the user's eyes. In some embodiments, the one or more monitor regions may comprise one or more samples, blocks, macroblocks, slices, CTUs, CTBs, coding units, coding blocks, or any other suitable regions of the video frames. For example, a monitor region may correspond to one or more M×N or N×N blocks, macroblocks, CTBs, or CTUs of sample data in a frame and various combinations thereof. In another example, the monitor region may comprise, consist essentially of, or consist of one or more blocks of samples associated with a face of the user. In yet another example, a monitor region may be a non-orthogonal region, such as a circle, ellipse, annulus, triangle, polygon, any other non-orthogonal region, or combination thereof.

In some embodiments, the continuous session authentication system 102 may provide for varying the size and number of monitor regions in different video frames or over different temporal durations. In some embodiments, the continuous session authentication system 102 may provide for generating and applying different weighting values to different monitor regions. For example, the continuous session authentication system 102 may assign a first weighting value to one or more monitor regions associated with the user's eyes, a second weighting value to one or more monitor regions associated with the user's jaw line, and a third weighting value to one or more monitor regions associated with the user's brow lines. The first weighting value may be greater than the second weighting value, and the second weighting value may be greater than the third weighting value.

In one illustrative example, during a first subduration of the second duration of time (e.g., during the monitoring state within about the first 60 seconds after session authentication), the continuous session authentication system 102 may generate a single monitor region of size M11×N11 (e.g., 64×32 samples) associated with the user's eyes. The continuous session authentication system 102 may generate and apply a first weighting value of 1.00 to a motion vector corresponding to the monitor region associated with the user's eyes during the first subduration of the second duration of time.

In another illustrative example, during a second subduration of the second duration of time (e.g., during the monitoring state between about the first 60 and 240 seconds after session authentication), the continuous session authentication system 102 may generate a first monitor region of size M21×N21 (e.g., 16×16 samples) associated with the user's left eye, a second monitor region of size M22×N22 (e.g., 16×16 samples) associated with the user's right eye, a third monitor region of size M23×N23 (e.g., 16×16 samples) associated with the user's left nostril, a fourth monitor region of size M24×N24 (e.g., 16×16 samples) associated with the user's right nostril, and a fifth monitor region of size M25×N25 (e.g., 48×16 samples) associated with the user's mouth. The continuous session authentication system 102 may generate and apply a first weighting value of 0.37 to each of two motion vectors corresponding to two monitor regions associated with the user's eyes, a second weighting value of 0.11 to each of two motion vectors corresponding to two monitor regions associated with the user's nostrils, and a third weighting value of 0.04 to a motion vector corresponding to a monitor region associated with the user's mouth.

In yet another illustrative example, during a third subduration of the second duration of time (e.g., during the monitoring state after about the first 240 seconds after session authentication), the continuous session authentication system 102 may generate a first monitor region of size M31×N31 (e.g., 16×16 samples) associated with the user's left eye, a second monitor region of size M32×N32 (e.g., 16×16 samples) associated with the user's right eye, a third monitor region of size M33×N33 (e.g., 4×4 samples) associated with the user's left nostril, a fourth monitor region of size M34×N34 (e.g., 4×4 samples) associated with the user's right nostril, a fifth monitor region of size M35×N35 (e.g., 4×8 samples) associated with the user's left mouth corner, a sixth monitor region of size M36×N36 (e.g., 16×8 samples) associated with the user's right mouth corner, and a seventh monitor region of size M37×N37 (e.g., 8×8 samples) associated with the user's forehead. The continuous session authentication system 102 may generate and apply a first weighting value of 0.21 to each of two motion vectors corresponding to two monitor regions associated with the user's eyes, a second weighting value of 0.09 to each of two motion vectors corresponding to two monitor regions associated with the user's nostrils, a third weighting value of 0.17 to each of two motion vectors corresponding to two monitor regions associated with the user's mouth corners, and a fourth weighting value of 0.23 to a motion vector corresponding to a monitor region associated with the user's forehead.

As shown by these illustrative examples, in some embodiments, the continuous session authentication system 102 provides a faster, cheaper, and less computing resource and data intensive process for providing continuous session authentication and monitoring by utilizing a single monitoring region immediately after authentication and then incrementally increasing the amount and granularity of monitoring regions as the session time increases (e.g., as the amount of time that has passed after session authentication increases). As a result, the continuous session authentication system 102 provides improvements in the functioning of computing systems or devices, such as a continuous session authentication system 102, continuous session authentication server device 104, server device 110, client device 112, or a combination thereof.

In some embodiments, the continuous session authentication system 102 may provide for generating a second video data structure in response to authenticating the session by the session authentication circuitry. The second video data structure may comprise a second video stream captured by the camera circuitry of the client device 112 over a second duration of time that begins after about the second time, and the second video stream may comprise a plurality of second video frames. In some embodiments, the one or more monitor regions for each of the plurality of second video frames may comprise one or more portions of a face of the user, and the continuous session authentication system 102 may provide for generating the second video data structure based on an intermittent monitoring of the one or more portions of the face of the user via the one or more monitor regions.

In some embodiments, the continuous session authentication system 102 may provide for extracting sample data from the monitor region for each of the plurality of second video frames. In some embodiments, the sample data may comprise samples extracted from one or more blocks encompassed by the monitor region. For example, the sample data may comprise samples extracted from one or more blocks of samples, each of which may comprise: a set of luma samples; a set of chroma samples; a set of red, green, and blue (RGB) samples; a set of unspecified monochrome or tri-stimulus color samples (e.g., XYZ samples); or combinations thereof; with or without an auxiliary arrays. For example, the block of samples may comprise a set of luma samples (Y), a first set of chroma samples (Cr), and a second set of chroma samples (Cb).

In some embodiments, the continuous session authentication system 102 may provide for generating motion data based on the sample data. In some embodiments, the continuous session authentication system 102 may provide for detecting, at a third time after the second time, a re-authentication trigger event based on the motion data.

In some embodiments, the motion data may comprise motion vector data indicative of motion vectors (e.g., inter prediction motion vectors). In some embodiments, the continuous session authentication system 102 may provide for generating smoothed motion vector data by applying a smoothing filter to the motion vector data. In some embodiments, the continuous session authentication system 102 may provide for generating an average or median motion vector based on the smoothed motion vector data. In some embodiments, the continuous session authentication system 102 may provide for generating an average or median motion vector from two or more motion vectors by generating and applying weighting values to each motion vector. For example, when generating the average or median motion vector based on five motion vectors corresponding to five monitor regions associated with the user's eyes, nostrils, mouth corners, and forehead, the continuous session authentication system 102 may apply a first weighting value of 0.21 to each of two motion vectors corresponding to two monitor regions associated with the user's eyes, a second weighting value of 0.09 to each of two motion vectors corresponding to two monitor regions associated with the user's nostrils, a third weighting value of 0.17 to each of two motion vectors corresponding to two monitor regions associated with the user's mouth corners, and a fourth weighting value of 0.23 to a motion vector corresponding to a monitor region associated with the user's forehead.

In some embodiments, the continuous session authentication system 102 may provide for determining whether a magnitude of the average motion vector exceeds a threshold motion vector value and, in response to determining that the magnitude of the average motion vector exceeds the threshold motion vector value, detecting the re-authentication trigger event. In some embodiments, the continuous session authentication system 102 may provide for: measuring an experimental average motion vector in an experimental movement condition; determining that a movement condition of the average motion vector corresponds to the experimental movement condition; and generating the threshold motion vector value based on the experimental average motion vector. In some embodiments, the threshold motion vector value may be a first threshold motion vector value and the continuous session authentication system 102 may provide for: determining whether the magnitude of the average motion vector exceeds a second threshold motion vector value greater than the first threshold motion vector value; and, in response to determining that the magnitude of the average motion vector exceeds the second threshold motion vector value, generating a session termination control signal indicative of an electronic instruction to terminate the session.

In some embodiments, the continuous session authentication system 102 may provide for generating a third video data structure in response to detecting the re-authentication trigger event. The third video data structure may comprise a third video stream captured by the camera circuitry of the client device 112 over a third duration of time that begins after about the third time, and the third video stream may comprise a plurality of third video frames. In some embodiments, the third video stream may comprise a face of the user, and the continuous session authentication system 102 may provide for generating the third video data structure based on a continuous monitoring of the face of the user.

In some embodiments, the continuous session authentication system 102 may provide for re-authenticating, at a fourth time after the third time, the session based on the authentication image data structure and the third video data structure. In some embodiments, the continuous session authentication system 102 may provide for re-authenticating the session for the user based on a region-by-region comparison of the authentication image data structure and one of the plurality of third video frames.

In some embodiments, the continuous session authentication system 102 may provide for monitoring, during the first duration of time, a face of the user in the first video stream; monitoring, during the second duration of time, a region of the face of the user in the second video stream, wherein the monitor region comprises the region of the face of the user; and monitoring, during the third duration of time, the face of the user in the third video stream.

In some embodiments, in the monitoring state, and in addition, or as an alternative, to utilizing the one or more monitor regions and motion estimation analysis, the continuous session authentication system 102 may provide for improved continuous user monitoring and authentication by utilizing sensors available on the client device 112, such as the client device 112's touchscreen, accelerometer, gyroscope, proximity sensor, or a combination thereof.

In some embodiments, the continuous session authentication system 102 may provide for authenticating, at a first time, a session for a user of a client device 112, such as a session between the client device 112 and a server device 110.

In some embodiments, the continuous session authentication system 102 may provide for, in response to authenticating the session at the first time, generating a video data structure comprising a video stream captured over a duration of time beginning at a second time and ending at a third time, wherein the second time is later than the first time, and wherein the third time is later than the second time. For example, the duration of time may be four seconds. In some embodiments, the video stream may comprise a face of a user of the client device 112.

In some embodiments, the continuous session authentication system 102 may provide for generating a video stream capture control signal indicative of an instruction for the client device 112 to capture the video stream over the duration of time and transmitting the video stream capture control signal to the client device 112. The client device 112 may receive the video stream capture control signal and, in response to receiving the video stream capture control signal, capture the video stream over the duration of time. For example, the continuous session authentication system 102 may determine that the client device 112A is a mobile device and generate a video stream capture control signal indicative of an instruction for the client device 112A to capture a "selfie" video stream (e.g., a video stream captured by a user-facing imaging device (e.g., camera) of the client device 112A) over a four second duration of time. The continuous session authentication system 102 may transmit the video stream capture control signal to the client device 112A, which may receive the video stream capture control signal and, in response to receiving the video stream capture control signal, capture a selfie video stream by a user-facing imaging device of the client device 112A over a four second duration of time. In this example, the video stream is a selfie video stream captured by a user-facing imaging device of the client device 112A over a four second duration of time. In some embodiments, the client device 112 may transmit the captured video stream to the continuous session authentication system 102, which may receive the captured video stream and generate a video data structure comprising the captured video stream. In other embodiments, the client device 112 may generate a video data structure comprising the captured video stream and transmit the video data structure to the continuous session authentication system 102.

In some embodiments, the continuous session authentication system 102 may provide for generating the video data structure based on an intermittent monitoring of the face of the user of the client device 112. For example, the continuous session authentication system 102 may provide for, in response to authenticating the session at the first time, generating a video data structure comprising a video stream captured over a four second duration of time once every five minutes until the end of the session. In some embodiments, the continuous session authentication system 102 may provide for generating the video data structure based on a continuous monitoring of the face of the user of the client device 112. For example, the continuous session authentication system 102 may provide for, in response to authenticating the session at the first time, generating a video data structure comprising a video stream captured over a four second duration of time once every four seconds until the end of the session.

In some embodiments, the continuous session authentication system 102 may provide for generating a biometric attribute data structure based on the video data structure. The biometric attribute data structure may comprise a set of biometric attributes (e.g., fingerprints, iris scans, retina scans, vein patterns, hair expressions, bodily expressions, gender, or the like) of the user derived from the video stream. For example, the set of biometric attributes may comprise biometric facial data, and the biometric facial data may comprise landmark data or nodal point data. In some embodiments, the continuous session authentication system 102 may provide for extracting the set of biometric attributes from the video stream using the video stream as a reference, wherein the biometric attribute data structure comprises the extracted set of biometric attributes.

In some embodiments, the continuous session authentication system 102 may provide for, in response to generating the biometric attribute data structure, transmitting, to a user profile server device 116, a request for user profile information associated with the user of the client device 112. The continuous session authentication system 102 may receive, from the user profile server device 116, a user profile data structure comprising the user profile information. The user profile information may comprise one or more previously input or acquired biometric attributes of the user (e.g., the user's previously input or acquired fingerprints, iris scans, retina scans, vein patterns, hair expressions, bodily expressions, gender, or the like). The continuous session authentication system 102 then may determine, using a computer-implemented facial recognition technique (e.g., a multi-region matching technique), that the set of biometric attributes matches the user profile information, generate a first control signal indicative of the determination that the set of biometric attributes matches the user profile information, and, in response to receipt of the first control signal, proceed with the passive continuous authentication process. Alternatively, the continuous session authentication system 102 may determine, using a computer-implemented facial recognition technique, that the set of biometric attributes does not match the user profile information, generate a second control signal indicative of the determination that the set of biometric attributes does not match the user profile information, and, in response to receipt of the second control signal, end the passive continuous authentication process and discontinue the session between the server device 110 and the client device 112.

In some embodiments, the continuous session authentication system 102 may provide for generating a sensor data structure comprising a set of sensor data captured over the duration of time (e.g., the same duration of time over which the video stream was captured). In some embodiments, the sensor data structure comprises, or is configured to store, the set of sensor data in temporal relation to the plurality of video frames of the video stream. In some embodiments, the continuous session authentication system 102 may provide for generating the sensor data structure in response to generation of the biometric attribute data structure (e.g., in response to receiving a control signal indicative of an instruction to generate the sensor data structure). In some embodiments, the sensor data structure may comprise a plurality of pointers, the set of sensor data may comprise a plurality of subsets of native sensor data, and each of the plurality of pointers may be associated with a respective one of the subsets of native sensor data. In some embodiments, the set of sensor data may comprise a plurality of subsets of sensor data captured over the duration of time by a plurality of sensors of the client device 112. In one illustrative example, the set of sensor data may comprise a first subset of sensor data captured over the duration of time by a first sensor of the client device 112A, a second subset of sensor data captured over the duration of time by a second sensor of the client device 112A, a third subset of sensor data captured over the duration of time by a third sensor of the client device 112A, and a fourth subset of sensor data captured over the duration of time by a fourth sensor of the client device 112A. The first sensor may comprise a touchscreen of the client device 112A, the second sensor may comprise an accelerometer of the client device 112A, the third sensor may comprise a gyroscope of the client device 112A, and the fourth sensor may comprise a proximity sensor of the client device 112A. In some embodiments, the continuous session authentication system 102 may provide for storing (e.g., in continuous session authentication database 106, in client device 112, or both) the set of sensor data in temporal relation to the video stream. For example, the video stream may comprise a plurality of video frames, the set of sensor data may comprise a plurality of sensor data snapshots, and the continuous session authentication system 102 may store the plurality of sensor data snapshots in temporal relation to the plurality of video frames (e.g., by storing each of the plurality of sensor data snapshots in temporal relation to a respective one of the plurality of video frames).

In some embodiments, the continuous session authentication system 102 may provide for generating a sensor data capture control signal indicative of an instruction for the client device 112 to capture sensor data over the duration of time and transmitting the sensor data capture control signal to the client device 112. The client device 112 may receive the sensor data capture control signal and, in response to receiving the sensor data capture control signal, capture the sensor over the duration of time using various sensors (e.g., touchscreen, accelerometer, gyroscope, proximity sensor) of the client device 112. For example, the continuous session authentication system 102 may determine that the client device 112A is a mobile device and generate a sensor data capture control signal indicative of an instruction for the client device 112A to capture touchscreen data, accelerometer data, gyroscope data, and proximity sensor data over the same four second duration of time over which the video stream is captured. The continuous session authentication system 102 may transmit the sensor data capture control signal to the client device 112A, which may receive the sensor data capture control signal and, in response to receiving the sensor data capture control signal, capture a first subset of sensor data captured over the four second duration of time by a touchscreen of the client device 112A, a second subset of sensor data captured over the four second duration of time by an accelerometer of the client device 112A, a third subset of sensor data captured over the four second duration of time by a gyroscope of the client device 112A, and a fourth subset of sensor data captured over the four second duration of time by a proximity sensor of the client device 112A. In some embodiments, the client device 112 may transmit the captured subsets of sensor data to the continuous session authentication system 102, which may receive the captured subsets of sensor data and generate a sensor data structure comprising the captured subsets of sensor data. In other embodiments, the client device 112 may generate a sensor data structure comprising the captured subsets of sensor data and transmit the sensor data structure to the continuous session authentication system 102.

In some embodiments, the continuous session authentication system 102 may provide for generating a behavioral attribute data structure based on the sensor data structure. In some embodiments, the continuous session authentication system 102 may provide for deriving, from the set of sensor data, a set of behavioral attributes of the user. In some embodiments, the behavioral attribute data structure may comprise a set of behavioral attributes of the user derived, by the continuous session authentication system 102, from the set of sensor data. In some embodiments, the continuous session authentication system 102 may provide for generating the behavioral attribute data structure based on the sensor data structure and the biometric attribute data structure. In some embodiments, the continuous session authentication system 102 may provide for deriving, from the set of sensor data and the set of biometric attributes, a set of behavioral attributes of the user. In some embodiments, the behavioral attribute data structure may comprise a set of behavioral attributes of the user derived, by the continuous session authentication system 102, from the set of sensor data and the set of biometric attributes. For example, the continuous session authentication system 102 may provide for correlating the biometric attribute data structure with the sensor data structure generating the behavioral attribute data structure based on the correlation of the biometric attribute data structure with the sensor data structure.

In some embodiments, the continuous session authentication system 102 may utilize sensors on the user device to determine how the user generally holds the user device, such as: the amount of tilt with which the user typically holds the user device (e.g., using a gyroscope); the distance the user typically holds the user device away from the user's face (e.g., using a proximity sensor); the amount the user typically shakes the user device when the user is holding the user device (e.g., using an accelerometer); the geographic location at which the user generally uses the user device (e.g., using GPS or location triangulation from access points, such as signal strength using a received signal strength indicator (RSSI) technique); and the technique by which the user typically inputs data into the user device (e.g., voice, handwritten, typed). In some embodiments, the continuous session authentication system 102 may utilize exogenous data to determine: on a day the markets are generally performing well, does the user look into the user's user device (e.g., market performance is exogenous data, and the user using the user device is behavioral data); does the user look at the user's confidential information dashboard while the user is waiting for coffee or breakfast (e.g., the fact the user is waiting for a particular reason at a particular place at a particular range of time is exogenous data); if the user is a risk analyst, does the user view the drone data for a particular incident when viewing the information on a particular customer (e.g., the risk analyst's use of drone data for a particular incident is exogenous data).

In some embodiments, the continuous session authentication system 102 may provide for generating an aggregated behavioral attribute data structure based on the sensor data structure, the biometric attribute data structure, an exogenous data structure, a user profile data structure, or a combination thereof. In some embodiments, the video data structure may comprise temporal information, and the continuous session authentication system 102 may provide for generating an aggregated behavioral attribute data structure based on a synchronization of the temporal information with the set of biometric attributes and the set of sensor data on a timeline. In some embodiments, the continuous session authentication system 102 may provide for transmitting, to an exogenous server device 114, a request for exogenous information associated with the user of the client device 112; receiving, from the exogenous server device 114, an exogenous data structure comprising the exogenous information; and generating an aggregated behavioral attribute data structure based on the behavioral attribute data structure and the exogenous data structure, wherein the aggregated behavioral attribute data structure comprises a set of aggregated behavioral attributes of the user derived from the set of sensor data and the exogenous information. Examples of aggregated behavioral attributes include, but are not limited to, how a user holds the user's user device, the speed at which the user writes on the user device, the speed and inclination when the user types on the user device, and the user's posture when using the user device (e.g., standing, sitting). In some embodiments, non-aggregated behavioral data may have a minimum impact in identifying the behavioral metrics of a user. For example, a person holding a user's user device may not help the system confirm that it is indeed the user who is holding the user device based on the data of how the user device is being held. Namely, the confidence factor is low. In contrast, if the system can combine multiple instances of these behavioral attributes, then the confidence factor increases and the confidence level in identifying the person holding the user's user device as the user is much higher. Accordingly, the system disclosed herein utilizes, and makes determinations based on, an aggregated behavioral data structure comprising aggregated behavioral attributes.

In some embodiments, the continuous session authentication system 102 may provide for re-authenticating, at a time after the first time, the session for the user of a client device 112 based on the biometric attribute data structure and the behavioral attribute data structure or the aggregated behavioral attribute data structure. For example, the continuous session authentication system 102 may provide for authenticating a session at a first time (e.g., 00:00:00 hours: minutes:seconds); capturing a video stream over a duration of time beginning at a second time (e.g., 00:00:01) and ending at a third time (e.g., 00:00:04), wherein the second time is later than the first time, and wherein the third time is later than the second time; capturing a set of sensor data over the duration of time beginning at about the second time and ending at about the third time; and re-authenticating the session at a fourth time (e.g., 00:00:05) later than the third time based on a biometric attribute data structure derived at least in part from the captured video stream and a behavioral attribute data structure derived at least in part from the captured set of senor data. In another example, the continuous session authentication system 102 may provide for authenticating a session at a first time (e.g., 00:00:00); capturing a video stream over a duration of time beginning at a second time (e.g., 04:00:01) and ending at a third time (e.g., 04:00:04); capturing a set of sensor data over the duration of time beginning at about the second time and ending at about the third time; and re-authenticating the session at a fourth time (e.g., 04:00:05) later than the third time based on a biometric attribute data structure derived at least in part from the captured video stream and an aggregated behavioral attribute data structure derived at least in part from the captured set of senor data and exogenous information received from one or more exogenous server devices 114.

There are many advantages of these and other embodiments described herein with reference to FIG. 1, such as: facilitating a faster, cheaper, and less computing resource and data intensive process for providing continuous session authentication and monitoring; and facilitating a faster, cheaper, and less computing resource and data intensive process for generating user behavioral data and aggregated behavioral data. Among other features, these and other embodiments described herein at least: reflect improvements in the functioning of computing systems or devices, such as continuous session authentication system 102, continuous session authentication server device 104, continuous session authentication database 106, server device 110, client device 112, or a combination thereof; reflect improvements to other technologies or technical fields as described herein; and effect transformations or reductions of particular articles (e.g., video data structures; sample data; motion data; authentication and monitoring states) to different states or things.

Example Implementing Apparatus

Figure 2:
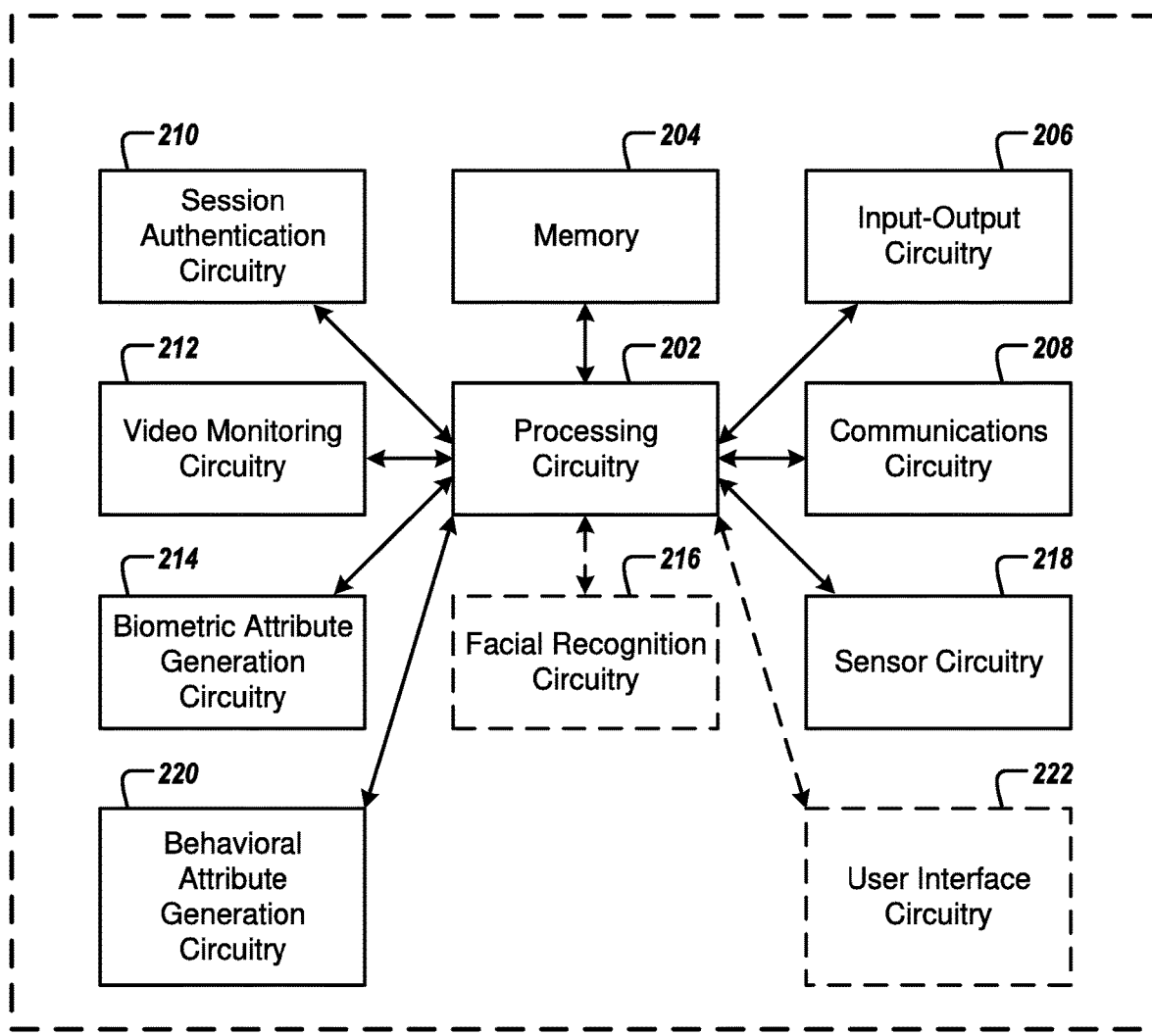
FIG. 2 illustrates a schematic block diagram of example circuitry that may perform various operations in accordance with some example embodiments described herein.

The continuous session authentication system 102 described with reference to FIG. 1 may be embodied by one or more computing systems, such as apparatus 200 shown in FIG. 2. As illustrated in FIG. 2, the apparatus 200 may include processing circuitry 202, memory 204, input-output circuitry 206, communications circuitry 208, session authentication circuitry 210, video monitoring circuitry 212, biometric attribute generation circuitry 214, facial recognition circuitry 216, sensor circuitry 218, behavioral attribute generation circuitry 220, and user interface circuitry 222. The apparatus 200 may be configured to execute the operations described above with respect to FIG. 1 and below with respect to FIGS. 3-6. Although some of these components 202-222 are described with respect to their functional capabilities, it should be understood that the particular implementations necessarily include the use of particular hardware to implement such functional capabilities. It should also be understood that certain of these components 202-222 may include similar or common hardware. For example, two sets of circuitry may both leverage use of the same processor, network interface, storage medium, or the like to perform their associated functions, such that duplicate hardware is not required for each set of circuitry.

The use of the term "circuitry" as used herein with respect to components of the apparatus 200 therefore includes particular hardware configured to perform the functions associated with respective circuitry described herein. Of course, while the term "circuitry" should be understood broadly to include hardware, in some embodiments, circuitry may also include software for configuring the hardware. For example, in some embodiments, "circuitry" may include processing circuitry, storage media, network interfaces, input-output devices, and other components. In some embodiments, other elements of the apparatus 200 may provide or supplement the functionality of particular circuitry. For example, the processing circuitry 202 may provide processing functionality, memory 204 may provide storage functionality, and communications circuitry 208 may provide network interface functionality, among other features.

In some embodiments, the processing circuitry 202 (and/or co-processor or any other processing circuitry assisting or otherwise associated with the processor) may be in communication with the memory 204 via a bus for passing information among components of the apparatus. The memory 204 may be non-transitory and may include, for example, one or more volatile and/or non-volatile memories. For example, the memory may be an electronic storage device (e.g., a computer readable storage medium). The memory 204 may be configured to store information, data, content, applications, instructions, or the like, for enabling the apparatus to carry out various functions in accordance with example embodiments of the present disclosure.

In some instances, the memory 204 may be configured to store data, data structures, and electronic information associated with one or more video streams, such as a video data structure comprising a video stream captured over a duration of time, where the video stream comprises a plurality of video frames. In some instances, the memory 204 may be configured to store data, data structures, and electronic information associated with user information (including, but not limited to, user profile information, authentication image data structures, and biometric facial data), session authentication request data structures, sample data, motion data, motion vectors, residuals, and threshold motion vector values. In some instances, the memory 204 may be configured to store data, data structures, and electronic information associated with one or more sets of sensor data, such as a sensor data structure comprising a set of sensor data captured over the duration of time. In some instances, the memory 204 may be configured to store data, data structures, and electronic information associated with the biometric attributes of a user, such as a biometric attribute data structure comprising a set of biometric attributes of the user derived from a video stream. In some instances, the memory 204 may be configured to store data, data structures, and electronic information associated with the behavioral attributes of a user, such as a set of behavioral attributes of the user derived from a set of sensor data, exogenous information, biometric attributes, or a combination thereof. In some instances, the memory 204 may be configured to store data, data structures, and electronic information associated with a session between a server device and a user of a client device, such as a user identifier (ID), client ID, session ID (e.g., a session key), token, cryptographic key (e.g., a public key, private key), any other suitable data, data structure, or electronic information associated with the session, or any combination thereof. It will be understood that the memory 204 may be configured to store any data, data structures, electronic information, requests, control signals, embodiments, examples, figures, techniques, processes, operations, methods, systems, apparatuses, or computer program products described herein, or any combination thereof.

The processing circuitry 202 may be embodied in a number of different ways and may, for example, include one or more processing devices configured to perform independently. Additionally or alternatively, the processing circuitry 202 may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In an example embodiment, the processing circuitry 202 may be configured to execute instructions stored in the memory 204 or otherwise accessible to the processor. Alternatively or additionally, the processor may be configured to execute hard-coded functionality. As such, whether configured by hardware or software methods, or by a combination of hardware with software, the processor may represent an entity (e.g., physically embodied in circuitry) capable of performing operations according to an embodiment of the present disclosure while configured accordingly. As another example, when the processor is embodied as an executor of software instructions, the instructions may specifically configure the processor to perform the functionality and/or operations described herein when the instructions are executed.

In some embodiments, the apparatus 200 may include input-output circuitry 206 that may, in turn, be in communication with processing circuitry 202 to provide output to the user and, in some embodiments, to receive an indication of a user input such as a command provided by a user. The input-output circuitry 206 may comprise a user interface (e.g., a user interface generated by user interface circuitry 222) comprising a display that may include a web user interface, a mobile application, a client device, a display device, a display screen, or any other suitable hardware or software. In some embodiments, the input-output circuitry 206 may also include a keyboard, a mouse, a joystick, a touch screen, touch areas, soft keys, a microphone, a speaker, or other input-output mechanisms. The processing circuitry 202 and/or input-output circuitry 206 (which may utilize the processing circuitry 202) may be configured to control one or more functions of one or more user interface elements through computer program instructions (e.g., software, firmware) stored on a memory (e.g., memory 204). Input-output circuitry 206 is optional and, in some embodiments, the apparatus 200 may not include input-output circuitry. For example, where the apparatus 200 does not interact directly with the user, the apparatus 200 may generate (e.g., by user interface circuitry 222) user interface data for display by one or more other devices with which one or more users directly interact and transmit the generated user interface data to one or more of those devices.

The communications circuitry 208 may be any device or circuitry embodied in either hardware or a combination of hardware and software that is configured to receive and/or transmit data from or to a network and/or any other device, circuitry, or module in communication with the apparatus 200. In this regard, the communications circuitry 208 may include, for example, a network interface for enabling communications with a wired or wireless communication network. For example, the communications circuitry 208 may include one or more network interface cards, antennae, buses, switches, routers, modems, and supporting hardware and/or software, or any other device suitable for enabling communications via a network. In some embodiments, the communication interface may include the circuitry for interacting with the antenna(s) to cause transmission of signals via the antenna(s) or to handle receipt of signals received via the antenna(s). These signals may be transmitted by the apparatus 200 using any of a number of wireless personal area network (PAN) technologies, such as Bluetooth® v1.0 through v5.0, Bluetooth Low Energy (BLE), infrared wireless (e.g., IrDA), ultra-wideband (UWB), induction wireless transmission, or any other suitable technologies. In addition, it should be understood that these signals may be transmitted using Wi-Fi, NFC, WiMAX or other proximity-based communications protocols.

The session authentication circuitry 210 includes hardware components designed or configured to request, receive, process, generate, and transmit data, data structures, control signals, and electronic information for use in continuous session authentication. In some embodiments, the session authentication circuitry 210 may be configured to authenticate, at a first time, a session for a user of a client device (e.g., client device 112), such as a session between the client device and a server device (e.g., server device 110). For example, the session authentication circuitry 210 may generate and use a first session key to authenticate a first session on behalf of a server device 110A and at the request of client device 112A. In another example, the session authentication circuitry 210 may generate and use a second session key to authenticate a second session between two other devices, such as server device 110B and at the request of client device 112B. In some instances, the session authentication circuitry 210 may receive a key from the client device, and then compare the received key to the generated session key to determine if a match is found. If so, the session authentication circuitry 210 may generate and transmit a communication to the server device comprising a validation of the session key received from the client device. If not, then the session authentication circuitry 210 may generate and transmit a communication to the server device indicating a validation failure.

In some embodiments, the session authentication circuitry 210 may be configured to receive, at a first time and from a client device (e.g., client device 112) or a server device (e.g., server device 110), a session authentication request data structure indicative of a request to authenticate a session for a user of the client device. In some embodiments, the session authentication circuitry 210 may be configured to retrieve, from a user profile server device (e.g., one or more user profile server devices 116), an authentication image data structure associated with the user, where the authentication image data structure was captured before the first time. In some embodiments, the session authentication circuitry 210 may be configured to authenticate, at a second time after the first time, the session based on the authentication image data structure and a first video data structure. The session authentication circuitry may be configured to receive, either directly or indirectly, the first video data structure from the video monitoring circuitry 212 or any other suitable circuitry described herein. The first video data structure may comprise a first video stream captured over a first duration of time that begins after about the first time, and the first video stream may comprise a plurality of first video frames. In some embodiments, the session authentication circuitry 210 may be configured to authenticate the session for the user based on a region-by-region comparison of the authentication image data structure and one of the plurality of first video frames.

In some embodiments, the session authentication circuitry 210 may be configured to re-authenticate, at a fourth time after a third time (e.g., a third time described with reference to video monitoring circuitry 212), the session based on the authentication image data structure and a third video data structure. The session authentication circuitry may be configured to receive, either directly or indirectly, the third video data structure from the video monitoring circuitry 212 or any other suitable circuitry described herein. The third video data structure may comprise a third video stream captured over a third duration of time that begins after about the third time, and the third video stream may comprise a plurality of third video frames. In some embodiments, the session authentication circuitry 210 may be configured to re-authenticate the session for the user based on a region-by-region comparison of the authentication image data structure and one of the plurality of third video frames.

In some embodiments, the session authentication circuitry 210 may be configured to receive, either directly or indirectly, a biometric attribute data structure from the biometric attribute generation circuitry 214. In some embodiments, the session authentication circuitry 210 may be configured to receive, either directly or indirectly, a behavioral attribute data structure, an aggregated behavioral attribute data structure, or both from the behavioral attribute generation circuitry 220. In some embodiments, the session authentication circuitry 210 may be configured to re-authenticate, at a time after the first time, the session for the user of the client device based on the biometric attribute data structure and the behavioral attribute data structure or the aggregated behavioral attribute data structure as described herein.

The video monitoring circuitry 212 includes hardware components designed or configured to request, receive, process, generate, and transmit data, data structures, control signals, and electronic information relating to electronic video. For example, the video monitoring circuitry 212 may comprise, or be in communication with, one or more imaging sensors such as photodetectors, photodiodes, cameras, or any other suitable devices or optoelectronic components. These hardware components may, for instance, utilize processing circuitry 202 to perform various computing operations and may utilize memory 204 for storage of video data structures, video streams, video frames, blocks, macroblocks, slices, CTUs, CTBs, coding units, coding blocks, residuals, or other electronic information received or generated by the video monitoring circuitry 212. In some embodiments, the video monitoring circuitry 212 may be configured to generate a video data structure comprising a video stream captured over a duration of time beginning at a second time and ending at a third time, wherein the second time is later than the first time, and wherein the third time is later than the second time. For example, the duration of time may be four seconds. In some embodiments, the video monitoring circuitry 212 may be configured to generate a video data structure in response to authentication, by the session authentication circuitry 210, of the session at the first time. In some embodiments, the video stream may comprise a face of a user of the client device 112. In some embodiments, the monitor region for each of the plurality of second video frames may comprise a portion of a face of the user, and the video monitoring circuitry 212 may be configured to generate the video data structure based on an intermittent monitoring of the portion of the face of the user of the client device as described herein. In some embodiments, the video monitoring circuitry 212 may be configured to generate the video data structure based on a continuous monitoring of the face of the user of the client device as described herein.

In some embodiments, the video monitoring circuitry 212 may be configured to generate a video stream capture control signal indicative of an instruction for a client device (e.g., client device 112) to capture the video stream over the duration of time and transmit the video stream capture control signal to the client device. The client device may receive, from the video monitoring circuitry 212, the video stream capture control signal and, in response to receipt of the video stream capture control signal, capture the video stream over the duration of time as described herein. In some embodiments, the client device may transmit the captured video stream to the video monitoring circuitry 212; the video monitoring circuitry 212 may receive the captured video stream from the client device and generate the video data structure comprising the captured video stream. In other embodiments, the client device may generate the video data structure comprising the captured video stream and transmit the video data structure to the video monitoring circuitry 212, which may receive the video data structure from the client device.

In some embodiments, the video monitoring circuitry 212 may be configured to generate a first video data structure. The first video data structure may comprise a first video stream captured over a first duration of time that begins after about the first time (e.g., about the time at which the session authentication circuitry 210 receives the session authentication request data structure), and the first video stream may comprise a plurality of first video frames. In some embodiments, the video monitoring circuitry 212 may be configured to generate the first video data structure in response to receipt of the session authentication request data structure by the session authentication circuitry 210.

In some embodiments, the video monitoring circuitry 212 may be configured to generate a second video data structure. The second video data structure may comprise a second video stream captured over a second duration of time that begins after about the second time (e.g., about the time at which the session authentication circuitry 210 authenticates the session), and the second video stream may comprise a plurality of second video frames. In some embodiments, the video monitoring circuitry 212 may be configured to generate the second video data structure in response to authentication of the session by the session authentication circuitry 210.

In some embodiments, the video monitoring circuitry 212 may be configured to determine one or more monitor regions for the plurality of second video frames. For example, the video monitoring circuitry 212 may be configured to process the first data structure, the second data structure, or both to determine (e.g., identify) one or more monitor regions for use in monitoring the plurality of second video frames. In some embodiments, the video monitoring circuitry 212 may be configured to vary the sizes of the one or more monitor regions in different video frames or over different temporal durations. In some embodiments, the video monitoring circuitry 212 may be configured to vary the number of monitor regions in different video frames or over different temporal durations. In some embodiments, the video monitoring circuitry 212 may be configured to generate and apply different weighting values to different monitor regions.

In some embodiments, the video monitoring circuitry 212 may be configured to extract sample data from the monitor region for each of the plurality of second video frames. In some embodiments, the video monitoring circuitry 212 may be configured to generate motion data based on the sample data. In some embodiments, the video monitoring circuitry 212 may be configured to detect, at a third time after the second time, a re-authentication trigger event based on the motion data. In some embodiments, the video monitoring circuitry 212 may be configured to generate a third video data structure. The third video data structure may comprise a third video stream captured over a third duration of time that begins after about the third time (e.g., about the time at which the video monitoring circuitry 212 detects the re-authentication trigger event), and the third video stream may comprise a plurality of third video frames. In some embodiments, the video monitoring circuitry 212 may be configured to generate the third video data structure in response to detection of the re-authentication trigger event.

In some embodiments, the video monitoring circuitry 212 may be configured to monitor, during the first duration of time, a face of the user in the first video stream. In some embodiments, the video monitoring circuitry 212 may be configured to monitor, during the second duration of time, a region of the face of the user in the second video stream, wherein the monitor region comprises the region of the face of the user. In some embodiments, the video monitoring circuitry 212 may be configured to monitor, during the third duration of time, the face of the user in the third video stream.

In some embodiments, the first video stream may comprise a face of the user, and the video monitoring circuitry 212 may be configured to generate the first video data structure based on a continuous monitoring of the face of the user. In some embodiments, the video monitoring circuitry 212 may be configured to generate the second video data structure based on an intermittent monitoring of the one or more monitor regions. In some embodiments, the third video stream may comprise a face of the user, and the video monitoring circuitry 212 may be configured to generate the third video data structure based on a continuous monitoring of the face of the user.

In some embodiments, the video monitoring circuitry 212 may be configured to generate smoothed motion vector data by applying a smoothing filter to the motion vector data. In some embodiments, the video monitoring circuitry 212 may be configured to generate an average or median motion vector based on the smoothed motion vector data. In some embodiments, the video monitoring circuitry 212 may be configured to determine whether a magnitude of the average motion vector exceeds a threshold motion vector value and, in response to determination that the magnitude of the average motion vector exceeds the threshold motion vector value, detect the re-authentication trigger event. In some embodiments, the video monitoring circuitry 212 may be configured to: measure an experimental average motion vector in an experimental movement condition; determine that a movement condition of the average motion vector corresponds to the experimental movement condition; and generate the threshold motion vector value based on the experimental average motion vector. In some embodiments, the threshold motion vector value may be a first threshold motion vector value and the video monitoring circuitry 212 may be configured to: determine whether the magnitude of the average motion vector exceeds a second threshold motion vector value greater than the first threshold motion vector value; and, in response to determination that the magnitude of the average motion vector exceeds the second threshold motion vector value, generate a session termination control signal indicative of an electronic instruction to terminate the session.

The biometric attribute generation circuitry 214 includes hardware components designed or configured to request, receive, process, generate, and transmit data, data structures, control signals, and electronic information, such as video data structures and biometric attribute data structures. In some embodiments, the biometric attribute generation circuitry 214 may be configured to receive a video data structure (e.g., from video monitoring circuitry 212, memory 204, or both) and generate a biometric attribute data structure based on the video data structure. The biometric attribute data structure may comprise a set of biometric attributes of the user derived from the video stream. For example, the set of biometric attributes may comprise biometric facial data, and the biometric facial data may comprise landmark data or nodal point data. In some embodiments, the biometric attribute generation circuitry 214 may be configured to extract the set of biometric attributes from the video stream using the video stream as a reference, wherein the biometric attribute data structure comprises the extracted set of biometric attributes. In some instances, the biometric attribute generation circuitry 214 may transmit the video data structure, the biometric attribute data structure, or both to facial recognition circuitry 216.

The facial recognition circuitry 216 includes hardware components designed or configured to request, receive, process, generate, and transmit data, data structures, control signals, and electronic information, such as video data structures, video streams, biometric data structures, biometric attributes, and user profile information. In some embodiments, the facial recognition circuitry 216 may be configured to receive the video data structure, the biometric attribute data structure, or both from the biometric attribute generation circuitry 214. In some embodiments, in response to receipt of the video data structure, the biometric attribute data structure, or both from the biometric attribute generation circuitry 214, the facial recognition circuitry 216 may be configured to generate and transmit, to a user profile server device (e.g., user profile server device 116), a request for user profile information associated with the user of the client device (e.g., client device 112). In some embodiments, the facial recognition circuitry 216 may be configured to receive, from the user profile server device, a user profile data structure comprising the user profile information.

In some embodiments, the facial recognition circuitry 216 may be configured to determine, using a computer-implemented facial recognition technique (e.g., a multi-region matching technique), that the set of biometric attributes matches the user profile information, generate a first control signal indicative of the determination that the set of biometric attributes matches the user profile information, and transmit the first control signal to the biometric attribute generation circuitry 214. The biometric attribute generation circuitry 214 may be configured to receive the first control signal from the facial recognition circuitry 216, and in response to receipt of the first control signal, transmit the biometric attribute data structure to the session authentication circuitry 210.

In some embodiments, the facial recognition circuitry 216 may be configured to determine, using a computer-implemented facial recognition technique, that the set of biometric attributes does not match the user profile information, generate a second control signal indicative of the determination that the set of biometric attributes does not match the user profile information, and transmit the second control signal to the biometric attribute generation circuitry 214. The biometric attribute generation circuitry 214 may be configured to receive the second control signal from the facial recognition circuitry 216, and in response to receipt of the second control signal, generate and transmit to the session authentication circuitry 210 a third control signal indicative of an instruction to end the passive continuous authentication process and discontinue the session between the server device and the client device. In some embodiments, the session authentication circuitry 210 may be configured to receive the third control signal from the biometric attribute generation circuitry 214, and in response to receipt of the third control signal, discontinue (e.g., terminate) the session between the server device and the client device.

In other embodiments, the session authentication circuitry 210 may be configured to receive the third control signal from the biometric attribute generation circuitry 214, and in response to receipt of the third control signal, switch from a passive continuous authentication process to an active continuous authentication process. For example, the session authentication circuitry 210 may generate and transmit to user interface circuitry 222 a popup display screen requesting that the user perform an active re-authentication operation, such as inputting a fingerprint authentication, photo or video facial recognition, password, or any other suitable operation.

The sensor circuitry 218 includes hardware components designed or configured to request, receive, process, generate, and transmit data, data structures, control signals, and electronic information, such as sensor data and sensor data structures. For example, the sensor circuitry 218 may comprise, or be in communication with, one or more sensors such as touchscreens, accelerometers, gyroscopes, proximity sensor, photodetectors, photodiodes, cameras, or any other suitable sensing devices. These hardware components may, for instance, utilize processing circuitry 202 to perform various computing operations and may utilize memory 204 for storage of sensor data, sensor data structures, or electronic information received or generated by the sensor circuitry 218.

In some embodiments, the sensor circuitry 218 may be configured to generate a sensor data structure comprising a set of sensor data captured over the duration of time (e.g., the same duration of time over which the video stream was captured by the video monitoring circuitry 212). In some embodiments, the sensor data structure comprises, or is configured to store, the set of sensor data in temporal relation to the plurality of video frames of the video stream. In some embodiments, the sensor circuitry 218 may be configured to generate the sensor data structure in response to receipt of the video data structure from the video monitoring circuitry 212. In some embodiments, the sensor circuitry 218 may be configured to generate the sensor data structure in response to generation of the biometric attribute data structure (e.g., in response to receiving, from the biometric attribute generation circuitry 214, a control signal indicative of an instruction to generate the sensor data structure). In some embodiments, the sensor data structure may comprise a plurality of pointers, the set of sensor data may comprise a plurality of subsets of native sensor data, and each of the plurality of pointers may be associated with a respective one of the subsets of native sensor data. In some embodiments, the set of sensor data may comprise a plurality of subsets of sensor data captured over the duration of time by a plurality of sensors of the client device (e.g., client device 112). In one illustrative example, the set of sensor data may comprise a first subset of sensor data captured over the duration of time by a first sensor of the client device, a second subset of sensor data captured over the duration of time by a second sensor of the client device, a third subset of sensor data captured over the duration of time by a third sensor of the client device, and a fourth subset of sensor data captured over the duration of time by a fourth sensor of the client device. The first sensor may comprise a touchscreen of the client device, the second sensor may comprise an accelerometer of the client device, the third sensor may comprise a gyroscope of the client device, and the fourth sensor may comprise a proximity sensor of the client device.

In some embodiments, the sensor circuitry 218 may be configured to generate a sensor data capture control signal indicative of an instruction for the client device to capture sensor data over the duration of time and transmit the sensor data capture control signal to the client device. The client device may receive the sensor data capture control signal and, in response to receiving the sensor data capture control signal, capture the sensor over the duration of time using various sensors (e.g., touchscreen, accelerometer, gyroscope, proximity sensor) of the client device. For example, the sensor circuitry 218 may be configured to may determine that the client device is a mobile device and generate a sensor data capture control signal indicative of an instruction for the client device to capture touchscreen data, accelerometer data, gyroscope data, and proximity sensor data over the same four second duration of time over which the video stream is captured by the video monitoring circuitry 212. The sensor circuitry 218 may be configured to may transmit (e.g., via communications circuitry 208) the sensor data capture control signal to the client device, which may receive the sensor data capture control signal and, in response to receiving the sensor data capture control signal, capture a first subset of sensor data over the four second duration of time by a touchscreen of the client device, capture a second subset of sensor data over the four second duration of time by an accelerometer of the client device, capture a third subset of sensor data over the four second duration of time by a gyroscope of the client device, and capture a fourth subset of sensor data over the four second duration of time by a proximity sensor of the client device. In some embodiments, the client device may transmit the captured subsets of sensor data to the sensor circuitry 218, which may receive the captured subsets of sensor data and generate a sensor data structure comprising the captured subsets of sensor data. In other embodiments, the client device may generate a sensor data structure comprising the captured subsets of sensor data and transmit the sensor data structure to the sensor circuitry 218.

The behavioral attribute generation circuitry 220 includes hardware components designed or configured to request, receive, process, generate, and transmit data, data structures, control signals, and electronic information, such as sensor data structures, sensor data, biometric attribute data structures, biometric attributes, video data structures, video streams, exogenous data structures, exogenous information, behavioral attribute data structures, behavioral attributes, aggregated behavioral attribute data structures, and aggregated behavioral attributes. In some embodiments, the behavioral attribute generation circuitry 220 may be configured to receive a sensor data structure (e.g., from sensor circuitry 218, memory 204, or both) and generate a behavioral attribute data structure based on the sensor data structure. In some embodiments, the behavioral attribute generation circuitry 220 may be configured to derive, from the set of sensor data, a set of behavioral attributes of the user. For example, the behavioral attribute data structure may comprise a set of behavioral attributes of the user derived, by the behavioral attribute generation circuitry 220, from the set of sensor data. In some embodiments, the behavioral attribute generation circuitry 220 may be configured to generate the behavioral attribute data structure based on the sensor data structure and the biometric attribute data structure. In some embodiments, the behavioral attribute generation circuitry 220 may be configured to derive, from the set of sensor data and the set of biometric attributes, a set of behavioral attributes of the user. For example, the behavioral attribute data structure may comprise a set of behavioral attributes of the user derived, by the behavioral attribute generation circuitry 220, from the set of sensor data and the set of biometric attributes. In some embodiments, the behavioral attribute generation circuitry 220 may be configured to generate the behavioral attribute data structure based on a correlation of the biometric attribute data structure with the sensor data structure. For example, the behavioral attribute generation circuitry 220 may be configured to correlate the set of sensor data with the set of biometric attributes and generate the behavioral attribute data structure based on the correlation of the set of sensor data with the set of biometric attributes.

In some embodiments, the behavioral attribute generation circuitry 220 may be configured to receive (e.g., from video monitoring circuitry 212, memory 204, or both) a video data structure comprising a video stream and to receive (e.g., from sensor circuitry 218, memory 204, or both) a sensor data structure comprising a set of sensor data. In some embodiments, the behavioral attribute generation circuitry 220 may be configured to store (e.g., in memory 204) the set of sensor data in temporal relation to the video stream. For example, the video stream may comprise a plurality of video frames, the set of sensor data may comprise a plurality of sensor data snapshots, and the behavioral attribute generation circuitry 220 may store the plurality of sensor data snapshots in temporal relation to the plurality of video frames (e.g., by storing each of the plurality of sensor data snapshots in temporal relation to a respective one of the plurality of video frames).

In some embodiments, the behavioral attribute generation circuitry 220 may be configured to generate an aggregated behavioral attribute data structure comprising a set of aggregated behavioral attributes of the user based on the video data structure, the biometric attribute data structure, the behavioral attribute data structure, exogenous information, any other suitable data, data structure, or electronic information, or a combination thereof. In some embodiments, the video data structure may comprise temporal information, and the behavioral attribute generation circuitry 220 may be configured to generate an aggregated behavioral attribute data structure based on a synchronization of the temporal information with the set of biometric attributes and the set of sensor data on a timeline. In some embodiments, the behavioral attribute generation circuitry 220 may be configured to generate and transmit, to an exogenous server device (e.g., exogenous server device 114), a request for exogenous information associated with the user of the client device. The behavioral attribute generation circuitry 220 may be configured to receive, from the exogenous server device 114, an exogenous data structure comprising the exogenous information. The behavioral attribute generation circuitry 220 may be configured to generate an aggregated behavioral attribute data structure based on the behavioral attribute data structure and the exogenous data structure, wherein the aggregated behavioral attribute data structure comprises a set of aggregated behavioral attributes of the user derived, by the behavioral attribute generation circuitry 220, from the set of sensor data and the exogenous information.

In some embodiments, the video monitoring circuitry 212, biometric attribute generation circuitry 214, facial recognition circuitry 216, sensor circuitry 218, and behavioral attribute generation circuitry 220 are configured to operate using a synchronized timestamp and thus need not be in communication with each other (e.g., their timestamp being in sync is sufficient). For example, when behavioral attribute generation circuitry 220 receives timestamped sensor data, behavioral attribute generation circuitry 220 will generate a behavioral attribute data structure based on the timestamped sensor data without receiving timing data from the video monitoring circuitry 212.

The user interface circuitry 222 includes hardware components designed or configured to generate user interface data configured to be displayed by a display device. For example, the user interface circuitry 222 may be configured to generate user interface data and transmit the generated user interface data to the input-output circuitry 206, and the input-output circuitry 206 may be configured to receive the user interface data and display the received user interface data on one or more display screens. In some embodiments, the user interface circuitry 222 may include hardware components designed or configured to generate the user interface data based on one or more portions of the video data structure, biometric attribute data structure, user profile data structure, sensor data structure, behavioral attribute data structure, aggregated behavioral attribute data structure, exogenous data structure, control signals, any other suitable data, data structures, or electronic information, or any combination thereof. For instance, the user interface circuitry 222 may include hardware components designed or configured to generate user interface data based on any embodiment or combination of embodiments described with reference to FIGS. 1-6.

It should also be appreciated that, in some embodiments, each of the session authentication circuitry 210, video monitoring circuitry 212, biometric attribute generation circuitry 214, facial recognition circuitry 216, sensor circuitry 218, behavioral attribute generation circuitry 220, and user interface circuitry 222 may include a separate processor, specially configured field programmable gate array (FPGA), application specific interface circuit (ASIC), or cloud utility to perform the above functions.

In some embodiments, the hardware components described above with reference to session authentication circuitry 210, video monitoring circuitry 212, biometric attribute generation circuitry 214, facial recognition circuitry 216, sensor circuitry 218, behavioral attribute generation circuitry 220, and user interface circuitry 222, may, for instance, utilize communications circuitry 208 or any suitable wired or wireless communications path to communicate with a server device (e.g., one or more of server devices 110A-110N), a client device (e.g., one or more of client devices 112A-112N), an exogenous server device (e.g., one or more of exogenous server devices 114), a user profile server device (e.g., one or more of user profile server devices 116), processing circuitry 202, memory 204, input-output circuitry 206, communications circuitry 208 (e.g., the communications circuitry 208 of a second apparatus implementing one or more portions of apparatus 200), each other, or any other suitable circuitry or device.

In some embodiments, one or more of the session authentication circuitry 210, video monitoring circuitry 212, biometric attribute generation circuitry 214, facial recognition circuitry 216, sensor circuitry 218, behavioral attribute generation circuitry 220, and user interface circuitry 222 may be hosted locally by the apparatus 200. In some embodiments, one or more of the session authentication circuitry 210, video monitoring circuitry 212, biometric attribute generation circuitry 214, facial recognition circuitry 216, sensor circuitry 218, behavioral attribute generation circuitry 220, and user interface circuitry 222 may be hosted remotely (e.g., by one or more cloud servers) and thus need not physically reside on the apparatus 200. Thus, some or all of the functionality described herein may be provided by a third party circuitry. For example, the apparatus 200 may access one or more third party circuitries via any sort of networked connection that facilitates transmission of data and electronic information between the apparatus 200 and the third party circuitries. In turn, the apparatus 200 may be in remote communication with one or more of the session authentication circuitry 210, video monitoring circuitry 212, biometric attribute generation circuitry 214, facial recognition circuitry 216, sensor circuitry 218, behavioral attribute generation circuitry 220, and user interface circuitry 222.

As described above and as will be appreciated based on this disclosure, embodiments of the present disclosure may be configured as systems, apparatuses, methods, mobile devices, backend network devices, computer program products, other suitable devices, and combinations thereof. Accordingly, embodiments may comprise various means including entirely of hardware or any combination of software with hardware. Furthermore, embodiments may take the form of a computer program product on at least one non-transitory computer-readable storage medium having computer-executable program code instructions (e.g., computer software) embodied in the storage medium. Any suitable computer-readable storage medium may be utilized including non-transitory hard disks, CD-ROMs, flash memory, optical storage devices, or magnetic storage devices. As will be appreciated, any computer-executable program code instructions and/or other type of code described herein may be loaded onto a computer, processor or other programmable apparatus's circuitry to produce a machine, such that the computer, processor, or other programmable circuitry that executes the code on the machine creates the means for implementing various functions, including those described herein.

The one or more server devices 110A-110N, one or more client devices 112A-112N, one or more exogenous server devices 114, and one or more user profile server devices 116 may be embodied by one or more computing devices, servers, data storage devices, or systems that also may include processing circuitry, memory, input-output circuitry, and communications circuitry. For example, a server device 110 may be a database server on which computer code (e.g., C, C++, C#, java, a structured query language (SQL), a data query language (DQL), a data definition language (DDL), a data control language (DCL), a data manipulation language (DML)) is running or otherwise being executed by processing circuitry. In another example, a client device 112 may be a smartphone on which an app (e.g., a mobile database app) is running or otherwise being executed by processing circuitry. As it relates to operations described in the present disclosure, the functioning of these devices may utilize components similar to the similarly named components described above with respect to FIG. 2. Additional description of the mechanics of these components is omitted for the sake of brevity. These device elements, operating together, provide the respective computing systems with the functionality necessary to facilitate the communication of data with the continuous session authentication system described herein.

Figure 3:
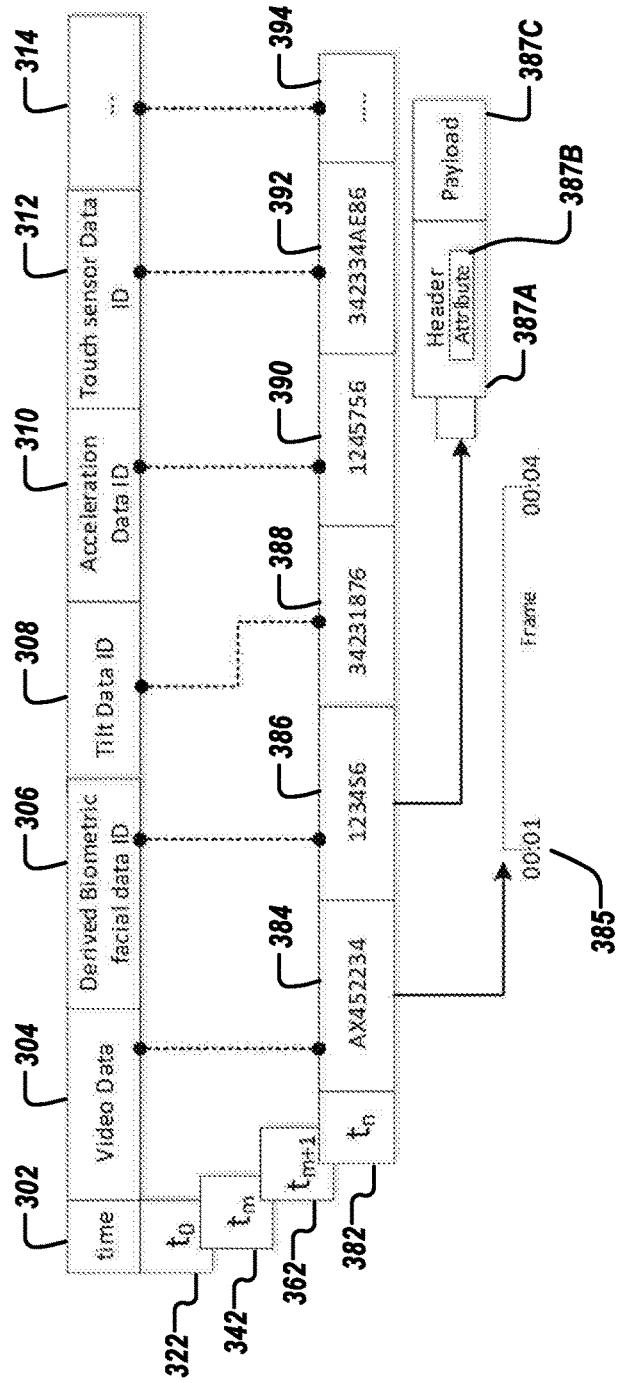
FIG. 3 illustrates example data structures in accordance with some example embodiments described herein.

FIG. 3 illustrates example data structures 300 in accordance with some example embodiments described herein. As shown in FIG. 3, example data structures 300 comprise temporal information 302, video data structure 304, sensor data structure 308, sensor data structure 310, sensor data structure 312, and any other suitable data structure 314. Video data structure 304 may comprise a video stream (e.g., video stream 385), such as a selfie video stream. The video stream may comprise a plurality of video frames. The term "ID" shown in FIG. 3 refers a pointer to a block of data that stores the sensor data in a form that is native to the sensor from which it is obtained (e.g., native sensor data).

In some embodiments, the continuous session authentication system may use video data structure 304 as a reference to store other sensor data structures, such as sensor data structure 308, sensor data structure 310, and sensor data structure 312. Sensor data structure 308 may comprise a first subset of sensor data, such as tilt data. Sensor data structure 310 may comprise a second subset of sensor data, such as acceleration data. Sensor data structure 312 may comprise a third subset of sensor data, such as touch sensor data. In some embodiments, the continuous session authentication system may generate a sensor data structure comprising sensor data structure 308, sensor data structure 310, sensor data structure 312, and any other suitable sensor data structure described herein. In some embodiments, the sensor data structure 308 comprises, or is configured to store, the first subset of sensor data in temporal relation to the plurality of video frames of the video stream 385; the sensor data structure 310 comprises, or is configured to store, the second subset of sensor data in temporal relation to the plurality of video frames of the video stream 385; and the sensor data structure 312 comprises, or is configured to store, the third subset of sensor data in temporal relation to the plurality of video frames of the video stream 385.

In some embodiments, the example data structures 300 may also comprise data structures derived from the primary data structures, such as biometric attribute data structure 306 which may be derived from video data structure 304. For example, the continuous session authentication system may use video data structure 304 to derive a set of biometric attributes (e.g., biometric facial data such as landmark or nodal point data in the video stream), and then use the derived set of biometric attributes to generate biometric attribute data structure 306, wherein the biometric attribute data structure 306 comprises the derived set of biometric attributes. In another example (not shown), the continuous session authentication system may use sensor data structure 308, sensor data structure 310, and sensor data structure 312 to derive behavioral attributes of the user, and then use the derived behavioral attributes to generate a behavioral attribute data structure, an aggregated behavioral attribute data structure, or both. For instance, the continuous session authentication system may overlay region information (e.g., biometric facial data) with the example data structures 300 to generate the behavioral attribute data structure. Further, the continuous session authentication system may select data from external databases (e.g., one or more exogenous server devices 114) based on the sensor data. For example, the continuous session authentication system may retrieve, based on the sensor data structures, GPS data to identify the location of the user, the client device, or both. The continuous session authentication system subsequently may use this data to generate aggregated behavioral attributes, such as "Customer John Doe checks his account summary every morning from [a particular coffee shop]."

As further shown in FIG. 3, the continuous session authentication system subsequently may generate one or more data structures at a plurality of times, such as a first time 322 (e.g., "$t_0$"), a second time 342 (e.g., "$t_m$"), a third time 362 (e.g., $t_{m+1}$"), and a fourth time 382 (e.g., "$t_n$"), where the subscripts m and n represent integer values greater than or equal to one, and where 0<m<n. For example, at the fourth time 382, example data structures 300 may comprise video data structure 384, biometric attribute data structure 386, sensor data structure 388, sensor data structure 390, sensor data structure 392, and any other suitable data structure 394. Video data structure 384 may comprise a video stream 385 comprising a plurality of video frames captured over a duration of time of four seconds. In some instances, video stream 385 may comprise a face of a user of the client device associated with an authenticated session. Biometric attribute data structure 386 may comprise: a header 387A; a set of biometric attributes 387B derived from the video stream 385; and a payload 387C.

Figure 4:
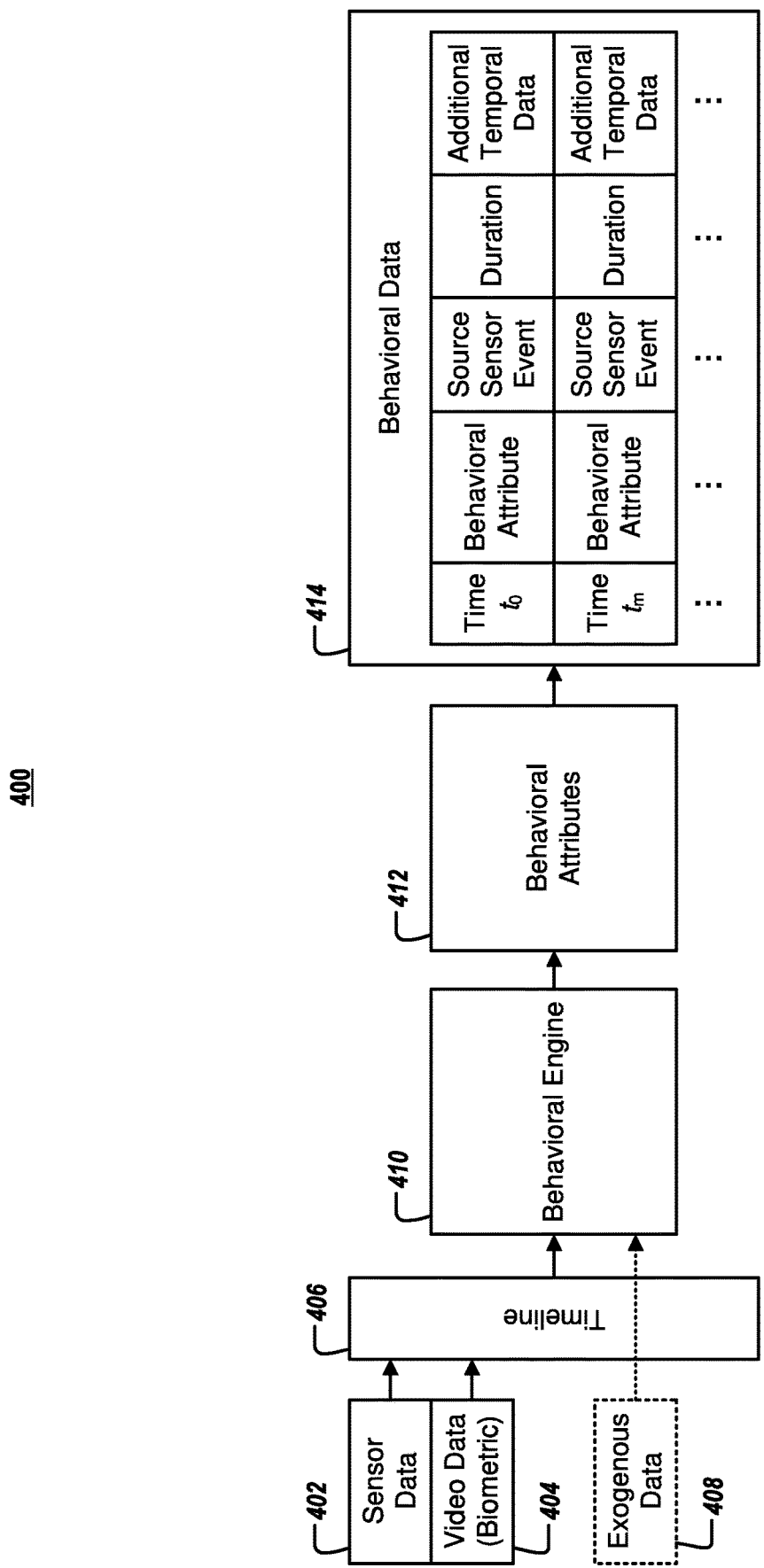
FIG. 4 illustrates example data structures in accordance with some example embodiments described herein.

FIG. 4 illustrates example data structures 400 in accordance with some example embodiments described herein. As shown in FIG. 4, example data structures 400 comprise sensor data 402, video data 404 (e.g., biometric data), timeline data 406, a behavioral engine 410 (e.g., behavioral attribute generation circuitry), a set of behavioral attributes 412 generated by the behavioral engine based on the sensor data 402, video data 404, and (optionally) exogenous data 408, and behavioral data 414 (e.g., comprising times, behavioral attributes, source sensor events, durations, and additional temporal data).

Figure 5:
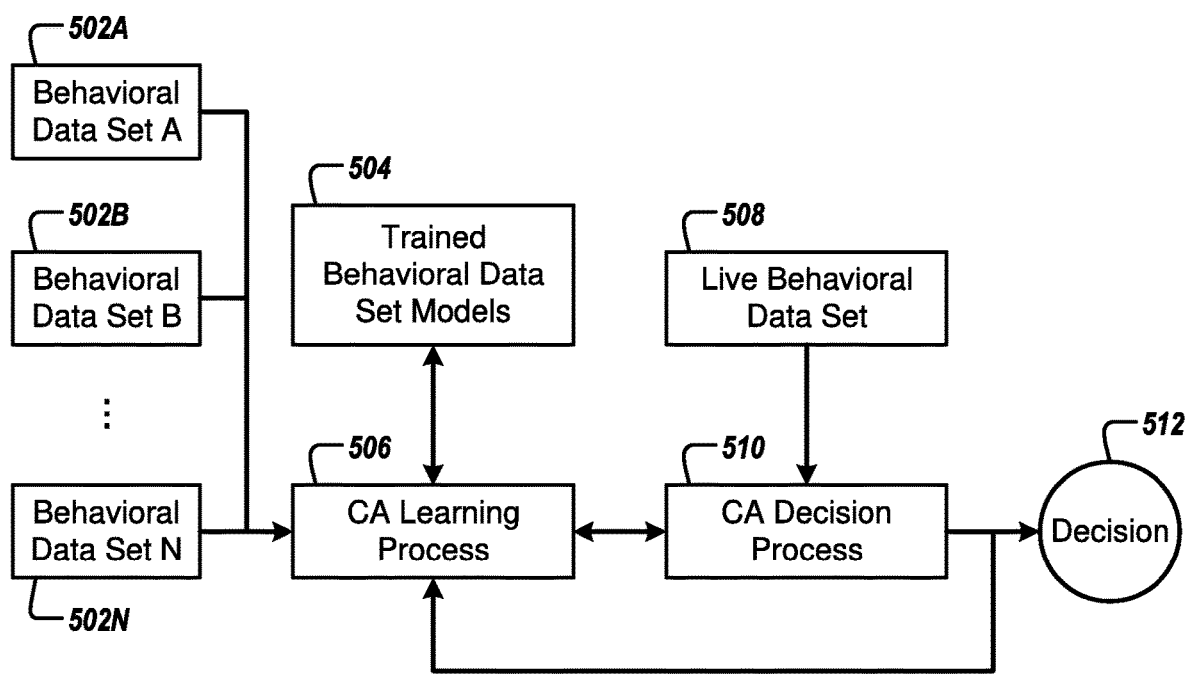
FIG. 5 illustrates an example continuous authentication learning environment in accordance with some example embodiments described herein.

FIG. 5 illustrates an example continuous authentication (CA) learning environment 500 in accordance with some example embodiments described herein. As shown in FIG. 5, the example CA learning environment 500 comprises a plurality of behavioral data sets 502A-502N, trained behavioral data set models 504, CA learning process 506, live behavioral data set 508, CA decision process 510, and decision 512 made by the CA decision process 510. In one illustrative embodiment, the CA learning environment 500 is configured to perform the following sequence of operations: (1) as part of the CA learning process, the CA learning process 506 ingests incoming behavioral data sets 502A-502N with labels; (2) as a further part of the CA learning process, the CA learning process 506 ingests trained behavioral data set models 504 (and, in some embodiments, trains the trained behavioral data set models 504 based on the behavioral data sets 502A-502N); (3) as part of the CA decision process, the CA decision process 510 ingests live behavioral data set 508 (e.g., a production behavioral data set for passive CA); (4) as a further part of the CA decision process, the CA decision process 510 uses the trained behavioral data set models 504 to determine whether the live behavioral data set 508 indicates the proper user with a high confidence level; (5) as a further part of the CA decision process, the CA decision process 510 generates a decision 512 indicating whether the live behavioral data set 508 indicates the proper user with a high confidence level; and (6) the CA decision process 510 transmits the decision 512 to the CA learning process to further train the trained behavioral data set models 504. In some embodiments, the CA learning environment 500 is configured to perform all, or a subset, of these operations without user input (e.g., without user interactivity).

Having described specific components of example devices involved in the present disclosure, example procedures for providing continuous session authentication and monitoring are described below in connection with FIG. 6.

Example Operations for Continuous Session Authentication and Monitoring

Figure 6:
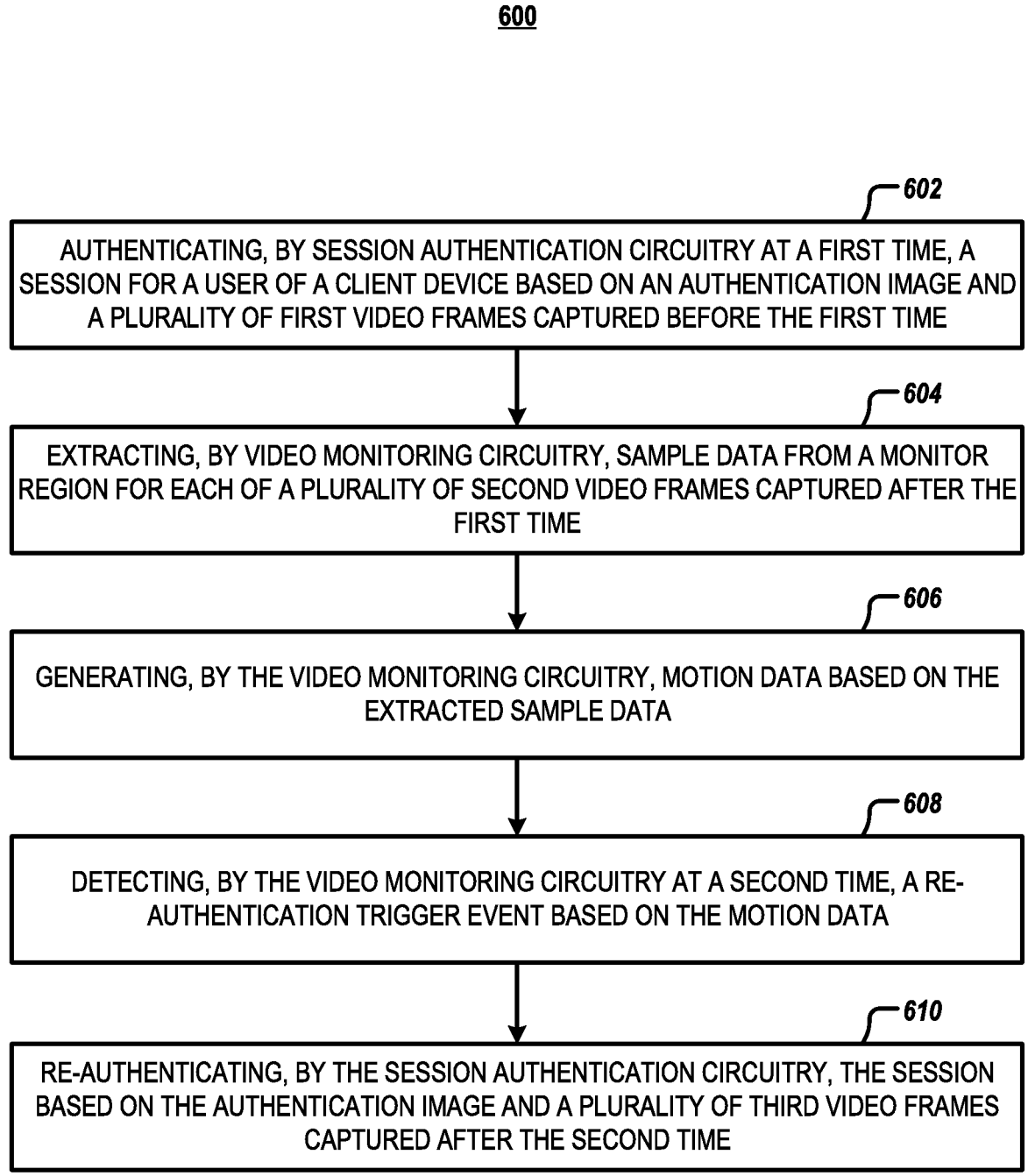
FIG. 6 illustrates an example flowchart for providing continuous session authentication and monitoring in accordance with some example embodiments described herein.

FIG. 6 illustrates an example flowchart 600 that contains example operations for providing continuous session authentication and monitoring in accordance with some example embodiments described herein. The operations illustrated in FIG. 6 may, for example, be performed by one or more components described with reference to continuous session authentication system 102 shown in FIG. 1, such as a continuous session authentication server device 104, a continuous session authentication database 106, a server device 110, a client device 112, an exogenous server device 114, or a user profile server device 116 in communication with continuous session authentication system 102; by apparatus 200 shown in FIG. 2; or by any combination thereof. In some embodiments, the various operations described in connection with FIG. 6 may be performed by the apparatus 200 by or through the use of one or more of processing circuitry 202, memory 204, input-output circuitry 206, communications circuitry 208, session authentication circuitry 210, video monitoring circuitry 212, biometric attribute generation circuitry 214, facial recognition circuitry 216, sensor circuitry 218, behavioral attribute generation circuitry 220, user interface circuitry 222, any other suitable circuitry, and any combination thereof.

As shown by operation 602, the apparatus 200 includes means, such as session authentication circuitry 210 or the like, for authenticating, at a first time, a session for a user of a client device (e.g., client device 112). In some embodiments, the apparatus 200 may authenticate the session based on an authentication image data structure and a plurality of first video frames captured before the first time. In some embodiments, the apparatus 200 may authenticate the session as described in more detail with reference to FIGS. 1-5.

As shown by operation 604, the apparatus 200 includes means, such as video monitoring circuitry 212 or the like, for extracting sample data from a monitor region for each of a plurality of second video frames captured after the first time. In some embodiments, the apparatus 200 may extract the sample data as described in more detail with reference to FIGS. 1-5.

As shown by operation 606, the apparatus 200 includes means, such as video monitoring circuitry 212 or the like, for generating motion data. In some embodiments, the apparatus 200 may generate the motion data based on the extracted sample data. In some embodiments, the apparatus 200 may generate the motion data as described in more detail with reference to FIGS. 1-5.

As shown by operation 608, the apparatus 200 includes means, such as video monitoring circuitry 212 or the like, for detecting, at a second time, a re-authentication trigger event. In some embodiments, the apparatus 200 may detect the re-authentication trigger event based on the generated motion data. In some embodiments, the apparatus 200 may detect the re-authentication trigger event as described in more detail with reference to FIGS. 1-5.

As shown by operation 610, the apparatus 200 includes means, such as session authentication circuitry 210 or the like, for re-authenticating the session based on the authentication image data structure and a plurality of third video frames captured after the second time. In some embodiments, the apparatus 200 may re-authenticate the session as described in more detail with reference to FIGS. 1-5.

In some embodiments, operations 602, 604, 606, 608, and 610 may not necessarily occur in the order depicted in FIG. 6, and in some cases one or more of the operations depicted in FIG. 6 may occur substantially simultaneously, or additional steps may be involved before, after, or between any of the operations shown in FIG. 6. As noted above, methods, apparatuses, systems, and computer program products are described herein that provide continuous session authentication and monitoring. By doing so, users of client devices are able to avoid the traditional problems surrounding continuous session authentication. For instance, through performance of the above operations, a user can avoid multiple interactions with the client device to maintain an authenticated session. Further, the server may provide continuous authentication and monitoring of the user's session in a faster, cheaper, and less resource and data intensive manner. For instance, example embodiments described herein facilitate and streamline the process of continuous session of a session so that the user may more quickly and easily maintain a continuously authenticated session with the server. Moreover, in some embodiments, example embodiments described herein facilitate the generation of behavioral data and aggregated behavioral data about the user in a faster, cheaper, and less data and resource intensive manner. The generated behavioral data and aggregated behavioral data may be used to provide for improved continuous session authentication or for any other suitable purpose, such as for transmission to a user profile server device. Accordingly, these and other embodiments described herein at least: reflect improvements in the functioning of computing systems or devices, such as continuous session authentication systems (including but not limited to continuous session authentication server devices and databases), server devices, client devices, and combinations thereof; reflect improvements to other technologies or technical fields as described herein; and effect transformations or reductions of particular articles to different states or things, such as video data structures, sample data, motion data, authentication and monitoring states, other articles described herein, and combinations thereof.

FIG. 6 thus illustrates flowcharts describing the operation of various systems (e.g., continuous session authentication system 102 described with reference to FIG. 1), apparatuses (e.g., apparatus 200 described with reference to FIG. 2), methods, and computer program products according to example embodiments contemplated herein. It will be understood that each operation of the flowcharts, and combinations of operations in the flowcharts, may be implemented by various means, such as hardware, firmware, processor, circuitry, and/or other devices associated with execution of software including one or more computer program instructions. For example, one or more of the procedures described above may be performed by execution of computer program instructions. In this regard, the computer program instructions that, when executed, cause performance of the procedures described above may be stored by a memory (e.g., memory 204) of an apparatus (e.g., apparatus 200) and executed by a processor (e.g., processing circuitry 202) of the apparatus. As will be appreciated, any such computer program instructions may be loaded onto a computer or other programmable apparatus (e.g., hardware) to produce a machine, such that the resulting computer or other programmable apparatus implements the functions specified in the flowchart operations. These computer program instructions may also be stored in a computer-readable memory that may direct a computer or other programmable apparatus to function in a particular manner, such that the instructions stored in the computer-readable memory produce an article of manufacture, the execution of which implements the functions specified in the flowchart operations. The computer program instructions may also be loaded onto a computer or other programmable apparatus to cause a series of operations to be performed on the computer or other programmable apparatus to produce a computer-implemented process such that the instructions executed on the computer or other programmable apparatus provide operations for implementing the functions specified in the flowchart operations.

The flowchart operations described with reference to FIG. 6 support combinations of means for performing the specified functions and combinations of operations for performing the specified functions. It will be understood that one or more operations of the flowcharts, and combinations of operations in the flowcharts, may be implemented by special purpose hardware-based computer systems which perform the specified functions, or combinations of special purpose hardware and computer instructions.

Use Cases

Having described example embodiments in general terms, the following example embodiments are provided to further illustrate a use case of some example embodiments. In some instances, the following example embodiments provide examples of how the continuous session authentication system disclosed herein may provide continuous session authentication and monitoring.

"Account Viewing" Use Case

"Account Viewing" is an illustrative example use case wherein the continuous session authentication system disclosed herein may provide continuous session authentication and monitoring, generate behavioral attribute data structures, or both. In this example, a user, such as an account holder, may use a client device, such as the user's smartphone or tablet, to access a server device for viewing account information associated with the user's account. The user and the client device may be located on public transportation, on an airplane, at a park, at a restaurant, at a coffee shop, at the user's workplace, or at any other suitable location. The user may use their client device to log in to the server device. As part of this process, the continuous session authentication system may receive, from either the client device or the server device, a request to authenticate a session for the user of the client device. In response, the continuous session authentication system may retrieve a previously authenticated image (e.g., a stored authentication image, an image of the user's face from a previously authenticated session) from a user profile database, from a continuous session authentication database, from the server device, or from the client device. At the same time, the continuous session authentication system may receive a real-time, or near real-time, a first video stream comprising a plurality of first video frames. The continuous session authentication system may then create and authenticate a session between the client device and the server device using a facial recognition technique, such as by performing a region-by-region comparison of the authentication image and one or more of the plurality of first video frames. The user may then view their account summary and perform other suitable actions.

Once the continuous session authentication system has authenticated the session, the continuous session authentication system may switch to a monitoring state to reduce computing resources while still providing continuous authentication. During or before the monitoring state, the continuous session authentication system may identify one or monitor regions encompassing one or more regions of interest of the user's face, such as the user's eyes, forehead, nostrils, and mouth. The continuous session authentication system then may monitor one or more of these identified monitor regions for movement and look for abrupt changes, gradual changes, or both in the field of view of the client device's camera through generating and analyzing motion vectors, residuals, or both. For example, the continuous session authentication system may continuously parse the video frame data, extract motion data from one or more of the one or more monitor regions, compare the extracted motion data to a threshold value, and upon exceeding the threshold value, call the authentication state for re-authentication, automatically terminate the session, or perform some other action. Additionally or alternatively, the continuous session authentication system may continuously determine, by applying facial and behavioral recognition techniques to sample data extracted from the one or more monitor regions, that the user is within viewing distance of the display screen and, as a result, passively remain, or actively determine to remain, in the monitoring state.

In another example, during the monitoring state, the user may be walking and then engage in a high level of activity such as running, jumping, or dropping the client device. The continuous session authentication system may determine, by applying facial and behavioral recognition techniques to sample data extracted from the one or more monitor regions, that the movement condition of the user corresponds to a walking movement condition. When the user begins to run, jump, or drop the client device, the continuous session authentication system may determine that the magnitude of an average or median motion vector in one or more of the one or more monitor regions exceeds a threshold motion vector value that corresponds to an experimental average motion vector (e.g., an experimentally measured average or median motion vector) for a walking experimental movement condition.

In the event that the continuous session authentication system detects a small motion (e.g., the average or median motion vector exceeds a first threshold motion vector value equal to a first static or dynamic amount, such as 110 percent of the experimental average motion vector), such as when the user begins to run, the continuous session authentication system then may call for re-authentication. In the event that the continuous session authentication system detects a large motion (e.g., the average or median motion vector exceeds a first threshold motion vector value equal to a first static or dynamic amount, such as 140 percent of the experimental average motion vector), such as when the user drops the client device, or determines that the monitor region has left the picture, the continuous session authentication system then may call for automatic log-out.

In yet another example, during the monitoring state, another person may look over the user's shoulder and the user may not be aware of that interaction because the user is looking at the display screen of the client device. The continuous session authentication system may determine, by applying facial and behavioral recognition techniques to sample data extracted from the one or more monitor regions, that a non-user is within viewing distance of the display screen (e.g., by determining that there is a second face whose eyes are facing towards the camera in the video stream captured by the client device); and generate and transmit a control signal to the client device that instructs the client device to blackout the display screen, generate a pop-up display screen overlay that completely overlays the user's account information, terminate the session, or perform some other action. For instance, the display screen going black provides an indication to the user that someone around the user may have been looking at the user's account information that was displayed on the display screen of the client device. The user may then decide not to view their account information presently, and re-open their account information sometime later in a more secure environment such as the user's home.

"Loan Application" Use Case

"Loan Application" is an illustrative example use case wherein the continuous session authentication system disclosed herein may provide continuous session authentication and monitoring, generate behavioral attribute data structures, or both. In this example, a user, such as an account holder, may use a client device, such as the user's smartphone or tablet, to access a server device for filling out an electronic loan application form. The continuous session authentication system may determine which portions of the information on the electronic loan application form are confidential (e.g., the user's social security number, telephone number, annual income) and which portions of the information on the electronic loan application form are non-confidential (e.g., the text of the blank or template loan application form). The user and the client device may be located on public transportation, on an airplane, at a park, at a restaurant, at a coffee shop, at the user's workplace, or at any other suitable location. The user may use their client device to log in to the server device and the continuous session authentication system may create and authenticate a session between the client device and the server device and then switch to a monitoring state. The user may then begin to input data to complete the electronic loan application form. The user may then set the client device on the user's lap where it is pointed towards another person who may be able to view the display screen and the user may not be aware of that interaction because the user is looking away from the display screen of the client device. However, at that point the continuous session authentication system may determine, using facial and behavioral recognition techniques, that a non-user is within viewing distance of the display screen (e.g., by determining that there is a change in the way that the user is using the phone); and generate and transmit a control signal to the client device that instructs the client device to blackout the regions of the display screen containing confidential information. By blacking out only those regions having confidential information, and not regions having non-confidential information, the continuous session authentication system disclosed herein reduces the amount of necessary computing resources and thus increases the speed and decreases the latency, processing consumption, and energy consumption required to provide continuous session authentication and monitoring, behavioral attribute data structure generation, or both.

Additionally or alternatively, the continuous session authentication system may determine which portions of the information on the electronic loan application form are more confidential (e.g., the user's social security number) and which portions of the information on the electronic loan application form are less confidential (e.g., the terms and conditions). If the continuous session authentication system determines that more confidential information is displayed on the display screen of the client device, the continuous session authentication system may activate the camera and sensors on the client device and perform facial and behavioral recognition at a higher frequency (e.g., once per second). If the continuous session authentication system determines that less confidential information is displayed on the display screen of the client device, the continuous session authentication system may activate the camera and sensors on the client device and perform facial and behavioral recognition at a lower frequency (e.g., once per minute). By doing so, the continuous session authentication system disclosed herein reduces the amount of necessary computing resources and thus increases the speed and decreases the latency, processing consumption, and energy consumption required to provide continuous session authentication and monitoring, behavioral attribute data structure generation, or both.

CONCLUSION

While various embodiments in accordance with the principles disclosed herein have been shown and described above, modifications thereof may be made by one skilled in the art without departing from the teachings of the disclosure. The embodiments described herein are representative only and are not intended to be limiting. Many variations, combinations, and modifications are possible and are within the scope of the disclosure. Alternative embodiments that result from combining, integrating, and/or omitting features of the embodiment(s) are also within the scope of the disclosure. Accordingly, the scope of protection is not limited by the description set out above, but is defined by the claims which follow, that scope including all equivalents of the subject matter of the claims. Each and every claim is incorporated as further disclosure into the specification and the claims are embodiment(s) of the present disclosure. Furthermore, any advantages and features described above may relate to specific embodiments, but shall not limit the application of such issued claims to processes and structures accomplishing any or all of the above advantages or having any or all of the above features.

In addition, the section headings used herein are provided for consistency with the suggestions under 37 C.F.R. § 1.77 or to otherwise provide organizational cues. These headings shall not limit or characterize the disclosure set out in any claims that may issue from this disclosure. For instance, a description of a technology in the "Background" is not to be construed as an admission that certain technology is prior art to any disclosure in this disclosure. Neither is the "Summary" to be considered as a limiting characterization of the disclosure set forth in issued claims. Furthermore, any reference in this disclosure to "disclosure" or "embodiment" in the singular should not be used to argue that there is only a single point of novelty in this disclosure. Multiple embodiments of the present disclosure may be set forth according to the limitations of the multiple claims issuing from this disclosure, and such claims accordingly define the disclosure, and their equivalents, that are protected thereby. In all instances, the scope of the claims shall be considered on their own merits in light of this disclosure, but should not be constrained by the headings set forth herein.

Also, techniques, systems, subsystems, and methods described and illustrated in the various embodiments as discrete or separate may be combined or integrated with other systems, modules, techniques, or methods without departing from the scope of the present disclosure. Other devices or components shown or discussed as coupled to, or in communication with, each other may be indirectly coupled through some intermediate device or component, whether electrically, mechanically, or otherwise. Other examples of changes, substitutions, and alterations are ascertainable by one skilled in the art and could be made without departing from the scope disclosed herein.

Many modifications and other embodiments of the disclosure set forth herein will come to mind to one skilled in the art to which these embodiments pertain having the benefit of teachings presented in the foregoing descriptions and the associated drawings. Although the drawings only show certain components of the apparatuses and systems described herein, it is understood that various other components may be used in conjunction with the apparatuses and systems described herein. Therefore, it is to be understood that the disclosure is not to be limited to the specific embodiments disclosed and that modifications and other embodiments are intended to be included within the scope of the appended claims. For example, the various elements or components may be combined, rearranged, or integrated in another system or certain features may be omitted or not implemented. Moreover, the steps in any method described above may not necessarily occur in the order depicted in the accompanying drawings, and in some cases one or more of the steps depicted may occur substantially simultaneously, or additional steps may be involved. Although specific terms are employed herein, they are used in a generic and descriptive sense only and not for purposes of limitation.

What is claimed is:

1. A computing system for providing continuous session authentication, the system comprising:
    session authentication circuitry in communication with a client device and a user profile server device, wherein the session authentication circuitry is configured to:
        receive, from the client device at a first time, a session authentication request data structure indicative of a request to authenticate a session for a user of the client device,
        retrieve, from the user profile server device, an authentication image data structure associated with the user, wherein the authentication image data structure was captured before the first time, and
        authenticate, at a second time after the first time, the session based on the authentication image data structure and a first video data structure; and
    video monitoring circuitry in communication with the session authentication circuitry, wherein the video monitoring circuitry is configured to
        in response to receipt of the session authentication request data structure by the session authentication circuitry, generate the first video data structure, wherein the first video data structure comprises a first video stream captured over a first duration of time that begins after about the first time, and wherein the first video stream comprises a plurality of first video frames,
        in response to authentication of the session by the session authentication circuitry, generate a second video data structure, wherein the second video data structure comprises a second video stream captured over a second duration of time that begins after about the second time, and wherein the second video stream comprises a plurality of second video frames,
determine a plurality of monitor regions associated with the plurality of second video frames,
assign a plurality of weighting values to each of the plurality of monitor regions,
extract sample data from the plurality of monitor regions for each of the plurality of second video frames,
generate motion data based on the sample data, wherein the motion data comprises motion vector data indicative of motion vectors,
apply the plurality of weighting values to the motion vector data to generate weighted motion vectors, and
detect, at a third time after the second time, a re-authentication trigger event based on the motion data, including determining whether a magnitude of an average weighted motion vector exceeds a threshold motion vector value.

2. The computing system of claim 1, wherein the video monitoring circuitry is further configured to:
monitor, during the first duration of time, a face of the user in the first video stream;
monitor, during the second duration of time, a region of the face of the user in the second video stream, wherein the monitor region comprises the region of the face of the user; and
monitor, during the third duration of time, the face of the user in a third video stream.

3. The computing system of claim 1, wherein the first video stream comprises a face of the user, and wherein the video monitoring circuitry is further configured to generate the first video data structure based on a continuous monitoring of the face of the user.

4. The computing system of claim 1, wherein the monitor region for each of the plurality of second video frames comprises a portion of a face of the user, and wherein the video monitoring circuitry is further configured to generate the second video data structure based on an intermittent monitoring of the portion of the face of the user.

5. The computing system of claim 1, wherein a third video stream, at the third time after the second time, comprises a face of the user, and wherein the video monitoring circuitry is further configured to generate the third video data structure based on a continuous monitoring of the face of the user.

6. The computing system of claim 1, wherein the monitor region comprises a region of a face of the user.

7. The computing system of claim 1, wherein the session authentication circuitry is further configured to authenticate the session for the user based on a region-by-region comparison of the authentication image data structure and one of the plurality of first video frames.

8. The computing system of claim 1, wherein the session authentication circuitry is further configured to re-authenticate the session for the user based on a region-by-region comparison of the authentication image data structure and one of a plurality of third video frames.

9. The computing system of claim 1, wherein the monitor region comprises a block of samples associated with a face of the user.

10. The computing system of claim 9, wherein the sample data comprises samples extracted from the block of samples.

11. The computing system of claim 10, wherein the block of samples comprises a set of luma samples.

12. The computing system of claim 11, wherein the block of samples further comprises a first set of chroma samples and a second set of chroma samples.

13. The computing system of claim 1, wherein the motion data comprises motion vector data indicative of motion vectors.

14. The computing system of claim 13, wherein the video monitoring circuitry is further configured to generate smoothed motion vector data by applying a smoothing filter to the motion vector data.

15. The computing system of claim 14, wherein the video monitoring circuitry is further configured to generate an average motion vector based on the smoothed motion vector data.

16. The computing system of claim 15, wherein the video monitoring circuitry is further configured to:
determine whether a magnitude of the average motion vector exceeds a threshold motion vector value; and
in response to determination that the magnitude of the average motion vector exceeds the threshold motion vector value, detect the re-authentication trigger event.

17. The computing system of claim 16, wherein the video monitoring circuitry is further configured to:
measure an experimental average motion vector in an experimental movement condition;
determine that a movement condition of the average motion vector corresponds to the experimental movement condition; and
generate the threshold motion vector value based on the experimental average motion vector.

18. The computing system of claim 16, wherein the threshold motion vector value is a first threshold motion vector value, and wherein the video monitoring circuitry is further configured to:
determine whether the magnitude of the average motion vector exceeds a second threshold motion vector value greater than the first threshold motion vector value; and
in response to determination that the magnitude of the average motion vector exceeds the second threshold motion vector value, generate a session termination control signal indicative of an electronic instruction to terminate the session.

19. A computer-implemented method for providing continuous session authentication, the computer-implemented method comprising:
authenticating, by session authentication circuitry at a first time, a session for a user of a client device based on an authentication image data structure and a plurality of first video frames captured before the first time;
determining, by video monitoring circuitry, a plurality of monitor regions associated with a plurality of second video frames captured after the first time;
assigning, by the video monitoring circuitry, a plurality of weighting values to each of the plurality of monitor regions;
extracting, by the video monitoring circuitry, sample data from the plurality of monitor regions for each of the plurality of second video frames;
generating, by the video monitoring circuitry, motion data based on the extracted sample data, wherein the motion data comprises motion vector data indicative of motion vectors;
applying, by the video monitoring circuitry, the plurality of weighting values to the motion vector data to generate weighted motion vectors; and
detecting, by the video monitoring circuitry at a second time, a re-authentication trigger event based on the motion data, including determining whether a magnitude of an average weighted motion vector exceeds a threshold motion vector value.

20. A computer program product for providing continuous session authentication, the computer program product comprising at least one non-transitory computer-readable storage medium storing computer-executable program code instructions that, when executed by a computing apparatus, cause the computing apparatus to:
- authenticate, by session authentication circuitry at a first time, a session for a user of a client device based on an authentication image data structure and a plurality of first video frames captured before the first time;
- determine, by video monitoring circuitry, a plurality of monitor regions associated with a plurality of second video frames captured after the first time;
- assign, by the video monitoring circuitry, a plurality of weighting values to each of the plurality of monitor regions;
- extract, by the video monitoring circuitry, sample data from the plurality of monitor regions for each of the plurality of second video frames;
- generate, by the video monitoring circuitry, motion data based on the extracted sample data, wherein the motion data comprises vector data indicative of motion vectors;
- apply, by the video monitoring circuitry, the plurality of weighting values to the motion vector data to generate weighted motion vectors; and
- detect, by the video monitoring circuitry at a second time, a re-authentication trigger event based on the motion data, including determining whether a magnitude of an average weighted motion vector exceeds a threshold motion vector value.

* * * * *